United States Patent
Tuscia et al.

(10) Patent No.: US 10,544,528 B2
(45) Date of Patent: Jan. 28, 2020

(54) TEXTILE CONSTRUCTS FORMED WITH FUSIBLE FILAMENTS

(71) Applicant: The North Face Apparel Corp., Wilmington, DE (US)

(72) Inventors: Eric Tuscia, Oakland, CA (US); Mary-Ellen Smith, Kihei, HI (US)

(73) Assignee: The North Face Apparel Corp., Wilmington, DE (US)

( * ) Notice: Subject to any disclaimer, the term of this patent is extended or adjusted under 35 U.S.C. 154(b) by 240 days.

(21) Appl. No.: 15/106,020

(22) PCT Filed: Dec. 23, 2014

(86) PCT No.: PCT/US2014/072251
§ 371 (c)(1),
(2) Date: Jun. 17, 2016

(87) PCT Pub. No.: WO2015/100369
PCT Pub. Date: Jul. 2, 2015

(65) Prior Publication Data
US 2017/0029989 A1    Feb. 2, 2017

Related U.S. Application Data

(60) Provisional application No. 61/920,364, filed on Dec. 23, 2013, provisional application No. 61/943,349, filed on Feb. 22, 2014.

(51) Int. Cl.
*D04B 7/16*     (2006.01)
*B32B 5/02*     (2006.01)
(Continued)

(52) U.S. Cl.
CPC ............ *D04B 7/16* (2013.01); *B32B 5/026* (2013.01); *B32B 27/12* (2013.01); *B32B 27/322* (2013.01);
(Continued)

(58) Field of Classification Search
CPC ...... B32B 2307/724; B32B 2307/7265; B32B 5/026; B32B 5/22; B32B 5/26;
(Continued)

(56) References Cited

U.S. PATENT DOCUMENTS 3,225,030 A    12/1965   Svoboda
4,258,094 A     3/1981   Benedyk
(Continued)

FOREIGN PATENT DOCUMENTS

DE    19931193      1/2001
EP     1149542     10/2001
(Continued)

OTHER PUBLICATIONS

Spencer, David J, "Knitting Technology", Chapters 3, 9, 13 copyright 1983 Published by Elsevier Ltd (Year: 1983).*
(Continued)

*Primary Examiner* — Jennifer A Steele
(74) *Attorney, Agent, or Firm* — Ganz Pollard, LLC

(57) ABSTRACT

A textile construct with a performance film formative built into a textile structure. The textile construct needs only to be subject to a fusing agent to cause the performance film formative to convert from its lattice structure (e.g., knit or woven structure) into a film that is built into a retained lattice structure of the textile. More particularly, the formation of the textile construct is based on fusion of selected filaments, e.g., thermoplastic fibers or yarns, to selectively create a film on one side or layer in the construct while substantially preserving the lattice structure of an opposing side or adjacent layer of non-fusible filaments in a lattice structure. This creates a hybrid film/lattice textile construct. Both open-faced and sandwiched constructions of the film in a unitary structure with the retained lattice structure of another side or layer(s) are possible.

30 Claims, 16 Drawing Sheets

(51) Int. Cl.
*D04B 1/18* (2006.01)
*B23B 27/12* (2006.01)
*B32B 27/12* (2006.01)
*B32B 27/32* (2006.01)

(52) U.S. Cl.
CPC ........ *D04B 1/18* (2013.01); *B32B 2262/0276* (2013.01); *B32B 2262/0292* (2013.01); *B32B 2307/51* (2013.01); *B32B 2307/724* (2013.01); *B32B 2307/7265* (2013.01); *B32B 2437/00* (2013.01); *D10B 2331/04* (2013.01); *D10B 2331/10* (2013.01); *D10B 2501/04* (2013.01)

(58) Field of Classification Search
CPC ... D04B 1/16; D04B 1/18; D04B 7/16; D10B 2401/10; D10B 2403/0112; Y10T 442/40; Y10T 442/406; Y10T 442/413; Y10T 442/419; Y10T 442/425; Y10T 442/431; Y10T 442/438; Y10T 442/45; Y10T 442/456; Y10T 442/463; Y10T 442/488
USPC .................................................. 442/304–319
See application file for complete search history.

(56) References Cited

U.S. PATENT DOCUMENTS

| | | | |
|---|---|---|---|
| 4,324,827 A | | 4/1982 | Obayashi et al. |
| 4,632,716 A | | 12/1986 | Smith |
| 4,748,078 A | | 5/1988 | Doi et al. |
| 4,761,324 A | | 8/1988 | Rautenberg et al. |
| 4,838,045 A | | 6/1989 | Cournoyer et al. |
| 5,215,807 A | * | 6/1993 | Day .......................... D02G 3/32 428/193 |
| 5,552,219 A | | 9/1996 | Vita et al. |
| 5,800,758 A | | 9/1998 | Topolkaraev et al. |
| 5,965,223 A | * | 10/1999 | Andrews .......... A41D 19/01511 138/123 |
| 6,071,578 A | | 6/2000 | Richardson et al. |
| 6,207,275 B1 | | 3/2001 | Heffner et al. |
| 6,588,237 B2 | | 7/2003 | Cole et al. |
| 6,623,681 B1 | * | 9/2003 | Taguchi .................... D01F 6/62 264/211.15 |
| 6,737,165 B1 | | 5/2004 | Smith et al. |
| 7,240,522 B2 | | 7/2007 | Kondou et al. |
| 7,380,420 B1 | | 6/2008 | Liu |
| 7,380,421 B1 | | 6/2008 | Liu |
| 7,384,513 B2 | | 6/2008 | Eagles |
| 8,173,558 B2 | | 5/2012 | Fukuoda et al. |
| 8,329,839 B2 | | 12/2012 | Smith et al. |
| 2004/0013883 A1 | | 1/2004 | Polegato Moretti |
| 2004/0237599 A1 | * | 12/2004 | Kondou .................... D04B 1/18 66/202 |
| 2005/0003141 A1 | | 1/2005 | Zafiroglu |
| 2006/0085894 A1 | * | 4/2006 | Yakopson ............... A61F 13/08 2/239 |
| 2007/0060006 A1 | | 3/2007 | Wenstrup et al. |
| 2007/0071942 A1 | | 3/2007 | Callaway et al. |
| 2007/0179255 A1 | | 8/2007 | Vedula et al. |
| 2008/0032580 A1 | * | 2/2008 | Fukuoka .................. D04B 1/18 442/306 |
| 2008/0096001 A1 | * | 4/2008 | Emden ................... A41D 31/02 428/222 |
| 2008/0229788 A1 | | 9/2008 | Zhang |
| 2008/0242177 A1 | | 10/2008 | Liu |
| 2009/0068908 A1 | | 3/2009 | Hincholiff |
| 2009/0223253 A1 | | 9/2009 | Chung et al. |
| 2010/0183836 A1 | | 7/2010 | Wangenheim |
| 2010/0189936 A1 | | 7/2010 | Irie et al. |
| 2011/0232002 A1 | | 9/2011 | Wiessner |
| 2012/0034834 A1 | | 2/2012 | Smith et al. |
| 2012/0260422 A1 | | 10/2012 | Rock et al. |
| 2012/0279260 A1 | * | 11/2012 | Dua ......................... D04B 1/16 66/171 |
| 2013/0074975 A1 | | 3/2013 | Heilman |
| 2013/0123437 A1 | | 5/2013 | Endo et al. |
| 2013/0255103 A1 | | 10/2013 | Dua et al. |
| 2013/0260104 A1 | | 10/2013 | Dua et al. |
| 2013/0260629 A1 | | 10/2013 | Dua et al. |
| 2015/0354101 A1 | * | 12/2015 | Liao ....................... D02G 3/324 442/182 |

FOREIGN PATENT DOCUMENTS

| | | | | |
|---|---|---|---|---|
| GB | 2097435 | | 11/1982 | |
| GB | 2366574 | | 3/2002 | |
| JP | S58 144150 | | 8/1983 | |
| JP | H01 266246 | | 10/1989 | |
| JP | H01266246 | * | 10/1989 | ............... A42B 1/00 |
| JP | H04 240252 | | 8/1992 | |
| WO | 2012107925 | | 8/2012 | |
| WO | 2012151408 | | 11/2012 | |
| WO | 2013090422 | | 6/2013 | |
| WO | 2013151968 | | 10/2013 | |

OTHER PUBLICATIONS

Polyester Properties; Chemnetbase; http://poly.chemnetbase.com downloaded Jan. 24, 2016 (Year: 2016).*
Bagherzadeh et al. Evolution of Moisture Management Behavior of High-wicking 3D Warp Knitted Spacer Fabrics. Fibers and Polymers. 2012, vol. 13, No. 4, 529-534.
Scheirs. Modem Fluoropolymers. Wiley (New York) 1997.
International Search Report and Written Opinion in International Application No. PCT/US14/072251 dated Apr. 8, 2015.
International Preliminary Report on Patentability in International Application No. PCT/US14/072251 dated Jun. 28, 2016.
Extended European Search Report for European Application No. 14873636.6, dated Sep. 6, 2017, 14 pages.

* cited by examiner

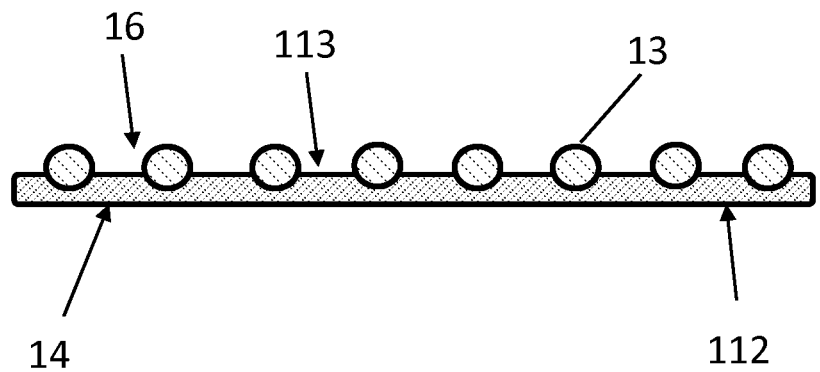
Figure 3.1
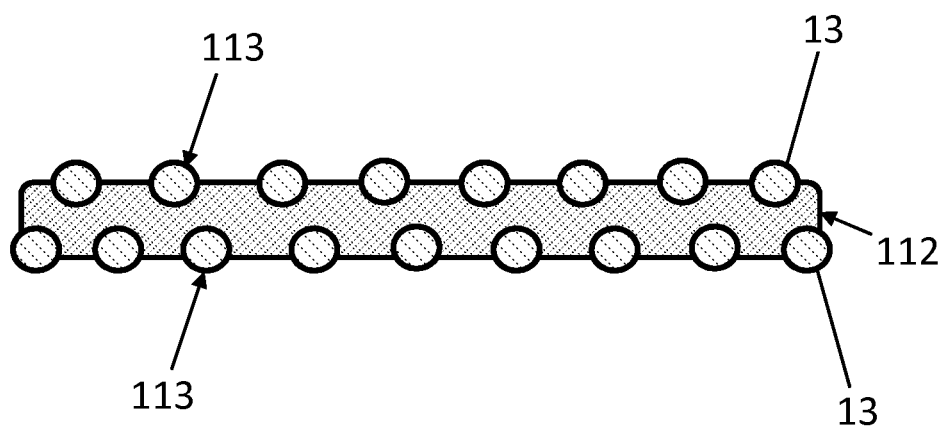
Figure 3.2

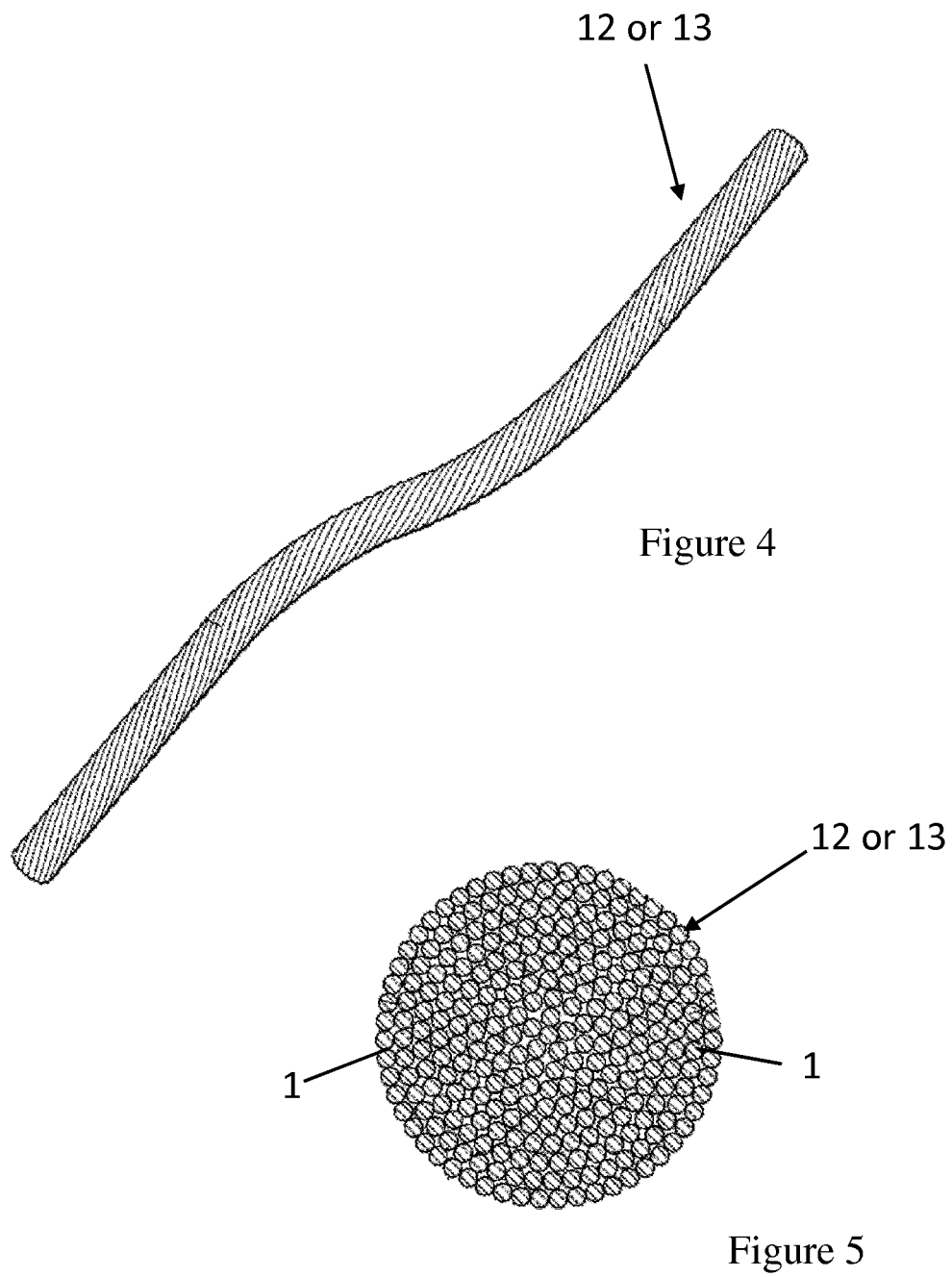

Melted fusible filament barrier/film

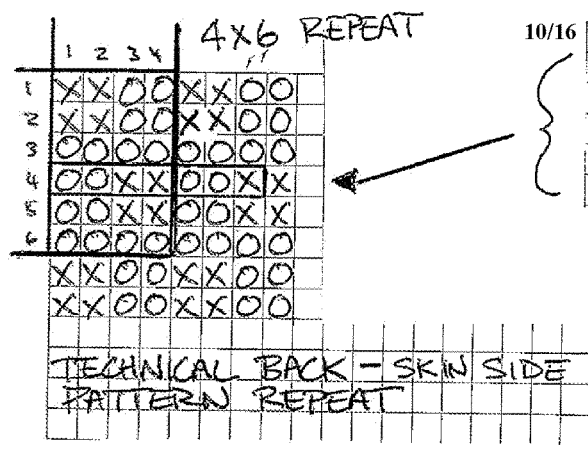
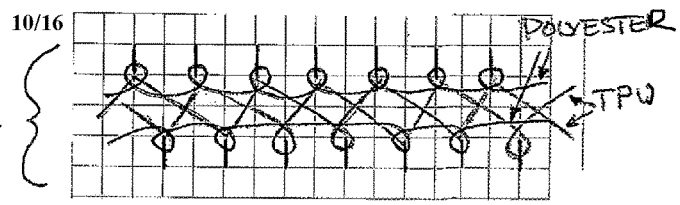
Figure 8A
Figure 8B
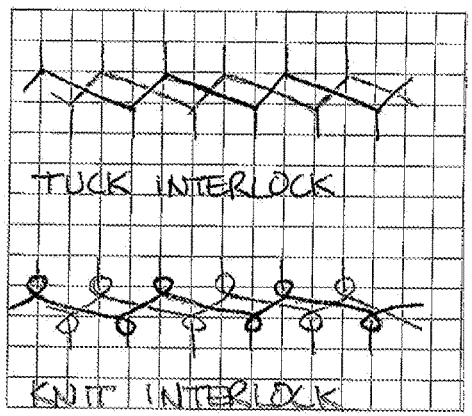
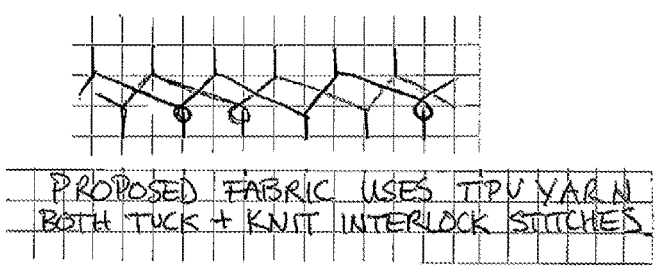
Figure 8C
Figure 8D
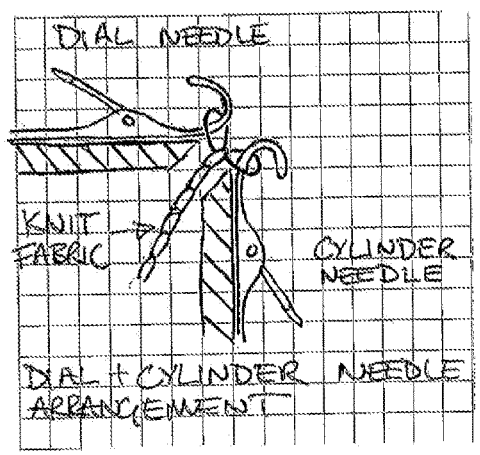
Figure 8E Yarns- 100% Polyester multifilament
- 100% TPU mono filament
One full pattern repeat- 24 courses
Dial needles- technical face
Cylinder needles- technical back- skin side
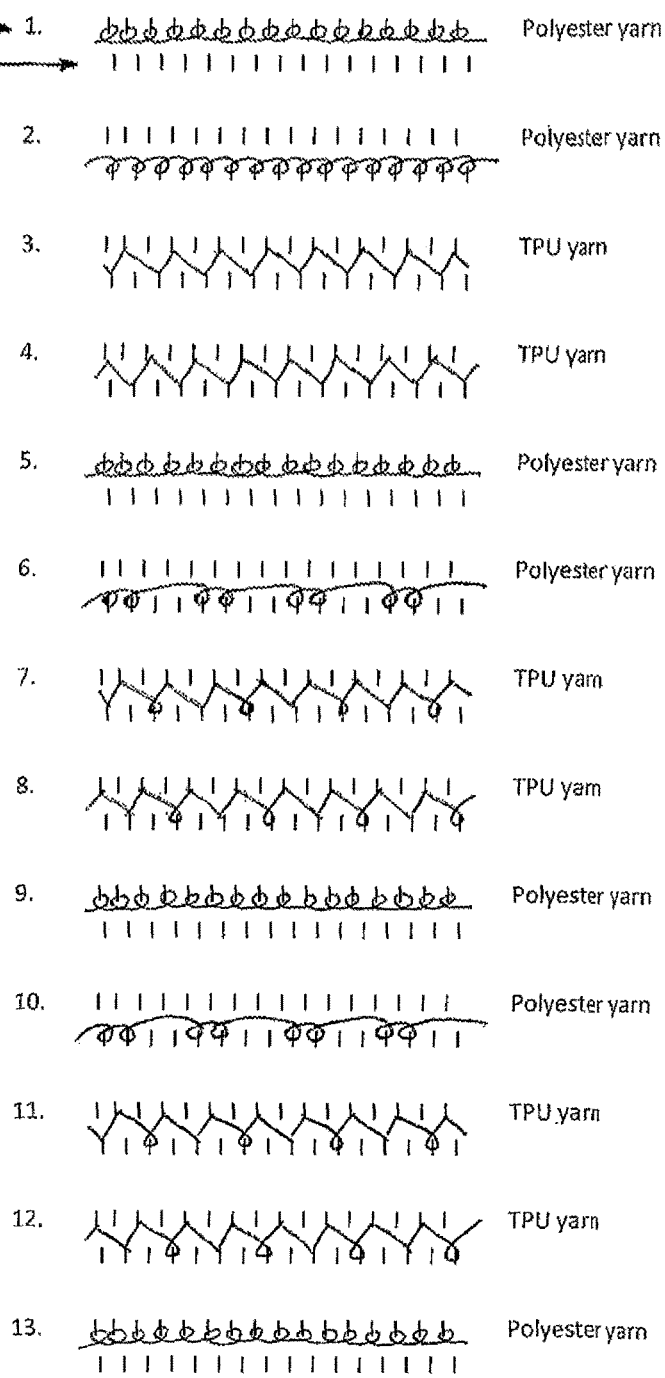
Figure 9A 14. Polyester yarn
15. TPU yarn
16. TPU yarn
17. Polyester yarn
18. Polyester yarn
19. TPU yarn
20. TPU yarn
21. Polyester yarn
22. Polyester yarn
23. TPU yarn
24. TPU yarn

Figure 9B

3 Layer performance weft knit structure-  Option A
Dial needles 1. 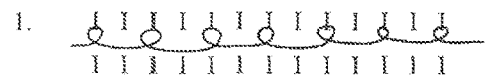
Cylinder needles
2. 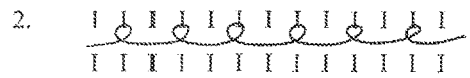
3. 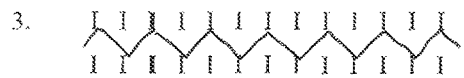
4. 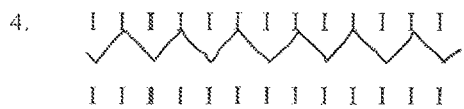
5. 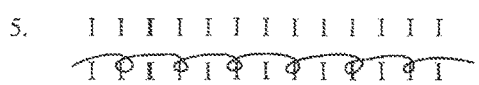
6. 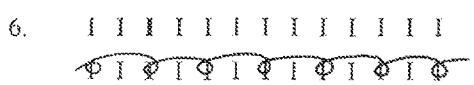
One repeat knit structure.
Stitch Key
^ = Tuck
ጸ = Knit
— = Float
I = Knitting needle
O = Non-fusible
X = Fusible
Technical back, pattern repeat
| | | | | |
|---|---|---|---|---|
| 1 | O | O | O | O |
| 2 | O | O | O | O |
| 3 | O | O | O | O |
| 4 | O | O | O | O |
| 5 | O | O | O | O |
| 6 | O | O | O | O |
| 7 | X | X | X | X |
| 8 | X | X | X | X |
Figure 10A 3 Layer performance weft knit structure-            __Option B__
Dial needles     1. 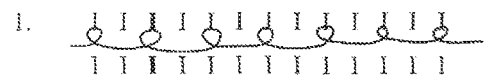
Cylinder needles
2. 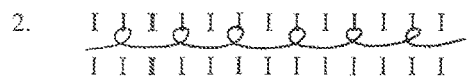
3. 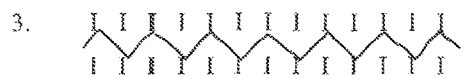
4. 
5. 
6. 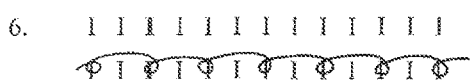
One repeat knit structure.
Stitch Key
^ = Tuck
Ջ = Knit
— = Float
I = Knitting needle
O = Non-fusible
X = Fusible
Technical back, pattern repeat
|   | 1 | 2 | 3 | 4 |
|---|---|---|---|---|
| 1 | X | X | X | X |
| 2 | X | X | X | X |
| 3 | X | X | X | X |
| 4 | X | X | X | X |
| 5 | X | X | X | X |
| 6 | X | X | X | X |
| 7 | O | O | O | O |
| 8 | O | O | O | O |
Figure 10B Standard weft knit spacer fabric construction Completed construction Modified weft knit spacer fabric construction used in option A & B of Figures 10A and 10B.

Construction of the technical face and back fabrics using non-fusible yarns

Construction of spacer Timber TPU yarns

Completed construction

Standard multifilament Polyester yarn, e.g., Polyester

 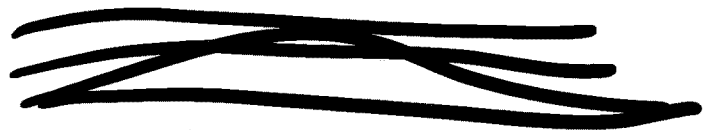

Standard multifilament textured Polyester yarn

 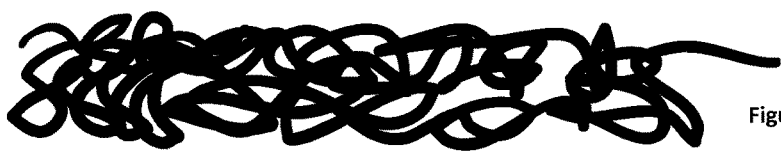

Example of a Bio-component filament

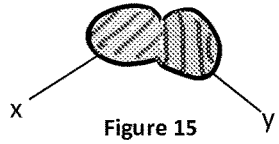

x       Figure 15       y

Example of a type of multifilament textured core spun yarn used, once heat is applied.
Textured multifilament wrapped Polyester filaments + a bio-component multifilament filament bundle.

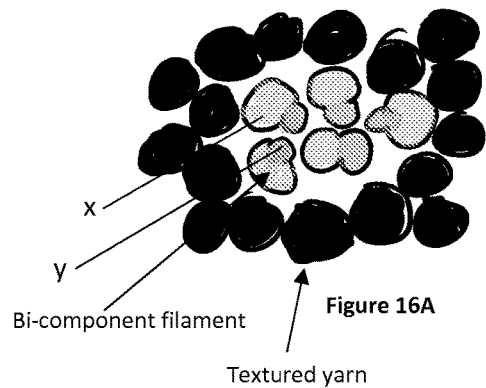 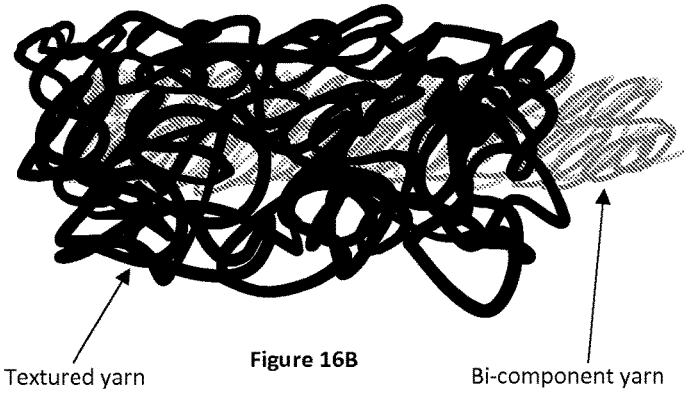

x
y
Bi-component filament       Figure 16A
                Textured yarn         Textured yarn       Figure 16B       Bi-component yarn

TEXTILE CONSTRUCTS FORMED WITH FUSIBLE FILAMENTS

RELATED APPLICATIONS

This application claims the benefit of and priority to U.S. Provisional Application Ser. No. 61/920,364, filed Dec. 23, 2013, U.S. Provisional Application Ser. No. 61/943,349, filed Feb. 22, 2014, the contents of which are hereby incorporated by reference as if recited in full herein for all purposes.

BACKGROUND

The inventive subject matter generally relates to novel textile constructions. It particularly relates to the formation of textile constructs based on fusion of selected filaments, e.g. fibers or yarns, in a textile structure to selectively create in the structure a film on one surface or layer(s) while preserving the lattice structure, e.g., the knit or woven structure of an opposing side or adjacent layer. More particularly, the inventive subject matter provides a textile construct wherein thermoplastic yarns or fibers are melted to form a fused film on one side or layer of the construct while another side or layer is maintained in a discrete knitted structure. The fused film may provide a membrane side or layer that has desired attributes, such as one or more of waterproofness, water resistance, wind resistance, and breathability.

A great demand exists for multi-attribute performance textiles. This is especially true with regards to outdoor and active sportswear. For example, there is a great demand for garments that provide combinations for waterproofness, wind resistance, and breathability, along with typical durability, comfort, and aesthetic attributes. In such garments, some form of wind or vapor barrier needs to be introduced onto a carrier or base textile substrate. Conventionally, this may be achieved melt coating or adhesively laminating a film onto a knit, woven or non-woven textile substrate. The disadvantage of such conventional techniques include that the processes are multi-step and component process and a textile's breathability may be reduced because of the adhesives used to join barrier layers to body portions of a garment. Further, the extra processing steps add cost and time to the manufacturing process, and weight to the finished article. The conventional techniques also alter the material properties of the underlying textiles that may detrimentally affect the suppleness of the garment. The use of laminated materials and coated materials also create finished products where the assembled materials are prone to delamination and degradation.

Another drawback in the conventional techniques is that the extra materials used and the separate assembly steps after manufacturing of base textile materials results in wasted materials and energy from cutting of materials to patterns and assembly of the materials using stitched seams, coatings or adhesives, which may not be ecofriendly.

SUMMARY

The inventive subject matter overcomes the disadvantages of the prior art by, among other things, providing a textile construct with a performance film formative built into a textile structure. The textile construct needs only to be subject to a fusing agent to cause the performance film formative to convert from its lattice structure (e.g., knit or woven structure) into a film that is built into a retained lattice structure of the textile. More particularly, the formation of the textile construct is based on fusion of selected filaments, e.g., thermoplastic fibers or yarns, to selectively create a film on one side or layer in the construct while preserving the lattice structure of an opposing side or adjacent layer of non-fusible filaments in a lattice structure. This creates a hybrid film/lattice textile construct. Both open-faced and sandwiched constructions of the film in a unitary structure with the retained lattice structure of another side or layer(s) are possible.

The various advantages of the inventive subject matter include that finished products can be engineered to have multiple performance and functional attributes based primarily on the use of standard textile formation processes and equipment. The performance attributes that may be engineered include waterproof or resistance characteristics, wind resistance, breathability, stretchability, durability and comfort. The inventive subject matter provides an eco-friendly alternative to existing technique by substantially reducing waste, energy and manufacturing time relative to conventional techniques.

In certain embodiments, the inventive subject is directed to textile construct that includes a first side or layer comprising a film of fused material; and a second side or layer in a discrete lattice structure of filaments, the second side being adjacent to and coextensive with the first side or layer, the fused film and discrete lattice structure being formed in a unitary, composite structure.

In some embodiments, the discrete lattice structure may be a knitted and/or woven structure. In some embodiments, the construct may be formed from a plaited knit structure of a plurality of two or more paired filaments in a plurality of courses and wales, at least one of the filaments being a fusible material that forms in the film of fused material on the first side or layer of the construct.

In some embodiments, the lattice construct may be a flat bed, circular, or 3D plaited knit and/or woven structures.

In some embodiments, the discrete lattice structure may be formed from a single jersey knit structure and the second side comprises the fused film, the fused film being formed from filaments in the same single jersey knit structure from which the discrete lattice is formed.

In some embodiments, the discrete lattice structure may be formed from within a double jersey knit structure and an intermediate layer comprises the fused film, the fused film being formed from spacer, fusible filaments in the same double jersey knit structure from which the discrete lattice is formed.

In the single or double knit structure, the non-fusible yarn used in a knit discrete lattice structure may be a shrinkable yarn. In double jersey knit constructions, the spacer, fusible filament may be a multifilament yarn.

In some embodiments, the construct may be an (1) intermediate layer comprising the film and (2) adjacent layers on each side of the intermediate layer comprising discrete lattice structures, at least one of the adjacent sides comprising the discrete lattice structure in a unitary structure with the film and the other adjacent side comprises a second discrete lattice structure of filaments in a unitary structure with the fused film of the intermediate layer.

In some embodiments, the lattice may be a woven structure. In some embodiments, the lattice may be a non-woven structure, such as a mat or felt.

In some embodiments, the fused film may be a membrane side or layer that provides waterproofness or water resistance and/or breathability to the construct. In some embodiments, the fused film may be a membrane side or layer that has porosity sufficient for air permeability of 1.0 to 80 CFM.

In some embodiments, the fusible filament comprises one or more filaments having a glass transition temperature of under about 110 degrees C. to about 160 degrees C. In some embodiments, the filament may consist of multiple filaments having glass transition temperatures of about 110 degrees C. to about 160 degrees C.

In some embodiments, the fusible filament comprises one or more thermoplastic filaments such as filament comprising TPU. In some possible embodiments, the fusible filament may be a thermoplastic PTFE filament.

In some embodiments, the fusible filament (pre-fusion) may be a bundle of between 1 to 150 filaments, each filament having denier of from about 0.5 to about 170 denier, and the overall bundle is from about 1 denier to about 170 denier.

In some embodiments, discrete lattice filament is selected from group of polyester, nylon, wool, cotton and/or silk.

In some embodiments, the film comprises a membrane having a porosity or diffusibility sufficient to allow for selective blocking of liquid phase water on one surface and passage of vapor phase water through an opposite surface during conditions intended for an outdoor apparel usage.

In some embodiments, the film has a pore density of more than 1 billion pores per inch$^2$ In some embodiments, the average pore size of pores in the film is less than 1 micron. In some embodiments, the film may have at least 9 billion pores per square inch. In some embodiments, the average pore size of pores in the film is 0.2 microns or less.

In some embodiments, the construct has an elasticity of 1% to about 30% before tensile failure, i.e., before reaching its tensile limit, which is the greatest stress that can be applied to a material without causing permanent deformation. (For metals and other materials that have a significant straight line portion in their stress/strain diagram, elastic limit is approximately equal to proportional limit. For materials that do not exhibit a significant proportional limit, elastic limit is an arbitrary approximation (the apparent elastic limit)).

In some possible embodiments, the film may have a thickness of from about 0.5 mm to about 3 mm.

In some possible embodiments of methods, the fusible filament includes a thermoplastic yarn and the fusing agent may be thermal energy.

In some possible embodiments, the shrink or stretch ratio of the non-fusible filaments and fusible filaments may be matched so that in the textile construct the shrinking or stretching of the material for one of the film or discrete lattice structure will not cause delamination, separation, tearing or other significant damage to the other of the film or lattice structure during shrinking or stretching of the textile construct.

In some possible embodiments of methods, the membrane side or layer provides waterproofness or water resistance and/or breathability to the construct according to one or more of the following standards:

Low range hydrostatic—AATCC127 (Option 2) or JIS L1092;
High range hydrostatic—ASTM D751 (Fed Std 191-A55);
MVTR (upright)—ASTM E96B;
MVTR (inverted)—JIS L 1099 (Method B); and
Air Permeability—ASTM D737

The inventive subject matter is also directed to a method of forming a textile construct, which may include the steps of: providing a composite lattice structure comprising an arrangement of (i) a first group of fusible filaments in a first lattice structure and (ii) a second group of non-fusible filaments in a second lattice structure, the first and second lattice structures being coextensively intermeshed to form the composite lattice structure, with the fusible filaments being selectively disposed primarily on one side of the composite lattice structure; and subjecting the composite lattice structure to a fusing agent, e.g., chemical, thermal, IR, ultrasonic, electromagnetic, electric, and/or pressure, sufficient to selectively cause the fusible filaments in the first lattice structure to fuse into a film substantially on one side or layer of the construct while maintaining the second lattice structure substantially in a discrete lattice structure.

In some possible embodiments of methods, the composite lattice structure further comprises a third group of non-fusible filaments in a third lattice structure on an opposite side of the film as the second lattice structure.

These and other embodiments are described in more detail in the following detailed descriptions and the figures.

The following is a description of various inventive lines under the inventive subject matter. The appended claims, as originally filed in this document, or as subsequently amended, are hereby incorporated into this Summary section as if written directly in. The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The accompanying figures show embodiments according to the inventive subject matter, unless noted as showing prior art.

FIG. 3.1 is a cross-sectional view of the construct shown in FIGS. 2B-2C.

FIG. 3.2 shows a cross-sectional view of an alternative embodiment where the fused layer is sandwiched between discrete lattice structures.

FIG. 4 shows a representative multi-filament yarn according to the prior art.

FIG. 5 shows a cross-sectional view of the yarn of FIG. 4.

FIGS. 8A-8E illustrate one possible knitting structure and scheme for a textile construct with a fusible layer.

FIGS. 9A-9B illustrate possible knitting steps and pattern for a textile construct with a fusible layer per FIGS. 8A-8E.

FIG. 10A illustrate knitting steps and pattern for an alternative textile construct with a fusible layer.

FIG. 10B illustrate knitting steps and pattern for an alternative textile construct with a fusible layer.

FIG. 13A shows a cross-section of a representative, conventional multi-filament yarn;

FIG. 13B shows a side view of a length of the yarn of FIG. 13A.

FIG. 14A shows a cross-section of a representative, conventional multi-filament yarn;

FIG. 14B shows a side view of a length of the yarn of FIG. 14A.

FIG. 15 shows a representative multicomponent yarn for use in textile constructs according to certain embodiments disclosed herein.

FIG. 16A shows a cross-section of a multifilament yarn formed of a core of multicomponent yarns and surrounding textured yarns; FIG. 16B shows a side view of a length of the yarn of FIG. 16A.

DETAILED DESCRIPTION

Figure 1:
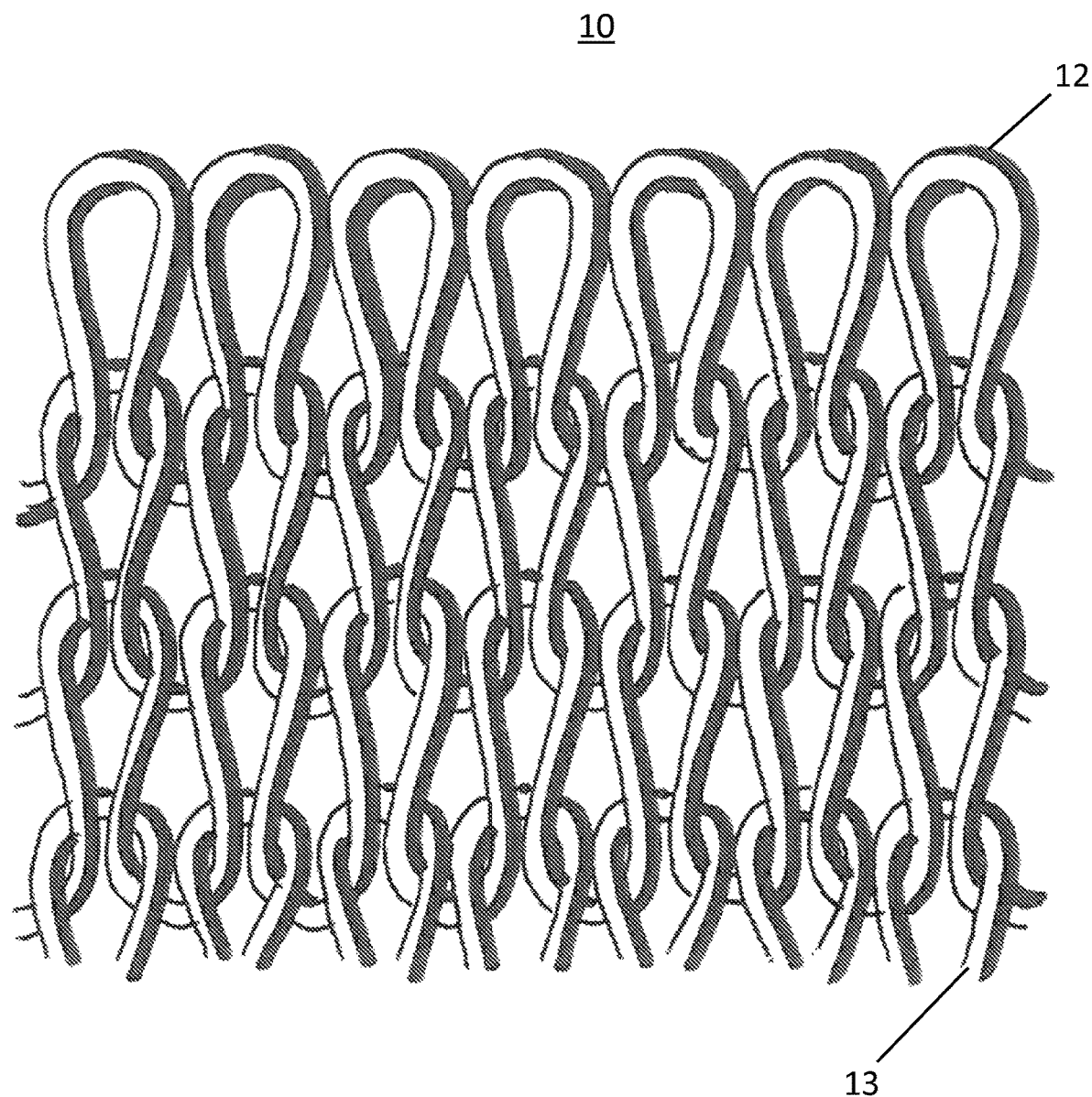
FIG. 1 shows a knitted textile construct before softening or melting of a fusible filament used in the construct.

Representative embodiments according to the inventive subject matter are shown in FIGS. 1-16, wherein the same or generally similar features share common reference numerals.

The inventive subject matter generally to relates to the formation of textile constructs based on fusion of selected filaments, e.g., yarns or fibers, in a lattice formed of the yarns or fibers to create in the textile asymmetric surfaces or layers in a textile construct. (Herein, products and components therefor, or sections or portions of products or components, may generally be referred to as "constructs.) More particularly, the inventive subject matter provides a textile construct wherein thermoplastic yarns or fibers are melted to form a textile construct that has a fused film on one side or layer while another side or layer is maintained in a discrete knitted structure. The fused film may provide a membrane side or layer that has desired attributes such as waterproofness or water resistance and breathability. The textile construct may be formed from a knit or woven structure based on various techniques known in the art. It may be formed from mat or felt structures based on various techniques known in the art.

As used herein, "filament" generally means a thin strand of material and encompasses yarns, threads, fibers, wires, cables and like thin, strand structures that maybe used to create a knitted, woven and nonwoven textiles. A filament may be in a single filament or multiple filaments arranged to function as a single strand of material.

As used herein, "lattice" means an arrangement of points or elements in a generally regular periodic pattern, particularly in a crisscrossing, interlacing, inter-looping or inter-twined pattern, as in knitted or woven structures. Although not technically within this description due to their irregularity in crisscrossing or intertwining of fiber elements, textiles having a mat or felt form are intended to be included as lattice structures herein unless context dictates otherwise.

As used herein in connection to filament dimensions, "diameter" means the diameter of a circular cross-section, in the strict sense of the word "diameter", and for filaments that have non-circular cross-sections, e.g., ovals and polygons, diameter means the non-circular filament has a cross-sectional area that corresponds to a circular cross-section that gives the same cross-sectional area. In case of filaments that do not have uniform diameters or cross-sectional areas along the length, an average for the length of a filament may be used. (Averages may also be used for other non-uniform structural or material parameters pertaining to this specification.)

As used herein, "film" means a thin, monolithic layer of material. A film may or may not have porosity but if porous, it has a substantially solid surface area, i.e., open pores do not account for a majority of the surface area. For example, a film may have at least a solid surface area of about 50% to about 100%, and includes, 50%, 65%, 70%, 75%, 80%, 85%, 90%, 95%, 96%, 97%, 98%, 99%, 99.9%, and 99.99% solid surface area.

As used herein, "membrane" means a film that separates two fluids (e.g., water or air external to a garment and air or vapor in the internal (user side) of a garment) and acts as a selective barrier, allowing some particles to pass through preferentially relative to others, e.g., allows water in vapor phase to pass through but not water in liquid phase.

In certain embodiments, the inventive subject matter is directed to a textile construct, and related methods of construction, wherein fusible filaments, such as thermoplastic yarns or fibers in a lattice are melted to form a textile construct that has a fused film on one side or layer while another side or layer is maintained in a discrete knitted structure. The fused film may provide various functional or performance attributes. For example, it may serve as a complete or partial barrier to air and water. It may serve as a stretchable layer for form fitting. It may serve as durable or protective layer against abrasion or impact force. Any combination of such functional properties may engineered into a textile construct according to the inventive subject matter.

FIGS. 1 to 7 show representative textile constructs 10, 100, 200, 300 having lattice in the nature of plaited knit structures and finished product 400, 500 that may embody the constructs. FIGS. 1 and 2A-2B show the construct 10 before and after varying degree of fusing of certain fusible filaments 12 in the knitted structure shown. FIG. 2A shows a partial fusion of filaments 12 to non-fusible filaments 13 to create a monolithic highly porous structure 112 on one side 14 and a discrete lattice structure of non-fusible filaments on the other side 16. Such a structure might be desirable in applications where permeability or breathability is needed. FIG. 2B shows filaments 12 fused into a film that has little or no porosity. Such an application may be desired where waterproofness and/or wind block is desired. Any degree of fusing between the structures of FIGS. 2A and 2C-D is also contemplated under the inventive subject matter.

The plaited knit constructs shown in the Figures are formed from a plurality of two or more paired filaments 12, 13 in a plurality of courses and wales, at least one of the paired filaments 12 being a fusible material that forms into a film 112 of fused material on the first side or layer of the construct. The structure may be a fabric formed using standard techniques for flat or circular plaited knit structures. In some embodiments, the fusible filament is made of a thermoplastic material that melts at a set temperature. Example materials are described in more detail below. In some embodiments, the non-fusible filament is made of a standard yarn or thread such as polyester, nylon, cotton, wool, etc. In some cases, the fusible filament may be bundle with non-fusible filaments, with the fusible films fusing around or to the non-fusible filaments and forming a film containing the non-fusible filaments.

As used herein, "fusible" and "non-fusible" are relative terms that mean under a given set of conditions, such as heat, the fusible filaments are capable of transforming to a glass or fluid state and congealing with each other into a film. In contrast, under the same conditions, the non-fusible filaments do not transition significantly to such states, and therefore remain substantially in discrete filament forms. However, in such forms, the fusible filaments may fusion bond to the non-fusible filaments. (As used herein, the non-fusible filaments may also be referred to as "lattice filaments", reflecting that they are retained substantially in a lattice form.) Further, a non-fusible filament may be made primarily of non-fusible material but include a minor portion that fuses for enhanced fusion bonding to the film formed from the fusible filament or to another substrate. As an example of use with another substrate, the non-fusible filament could have a core of non-fusible material and a surrounding sheath of fusible material. The sheath material could be adapted to fuse to another layer of textile or other object used in the construction or assembly of a product, such as a garment, while the core material is retained in its discrete lattice structure. For example, the textile construct with a film formed from the fusible filaments could be combined with a separate sheet of material, e.g., an outer shell material for a jacket, by fusing the sheath material with the outer shell material. This results in the discrete lattice structure from the core material of the non-fusible elements being disposed between the outer shell material and the film from the fusible filaments.

Figure 2A:
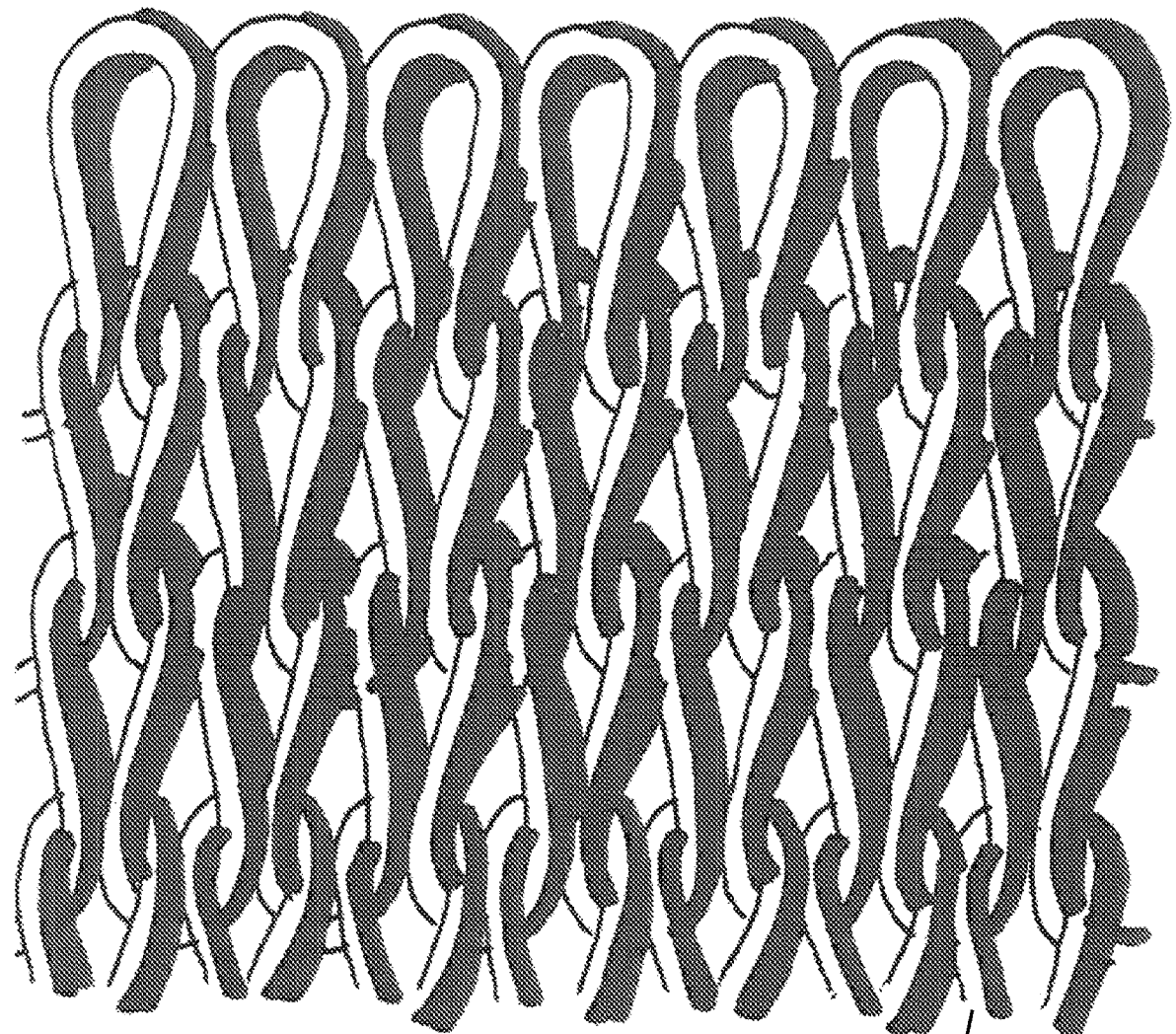
FIGS. 2A-2B show the construct of FIG. 1 after varying degrees of fusion of the fusible filaments.
Figure 2B:
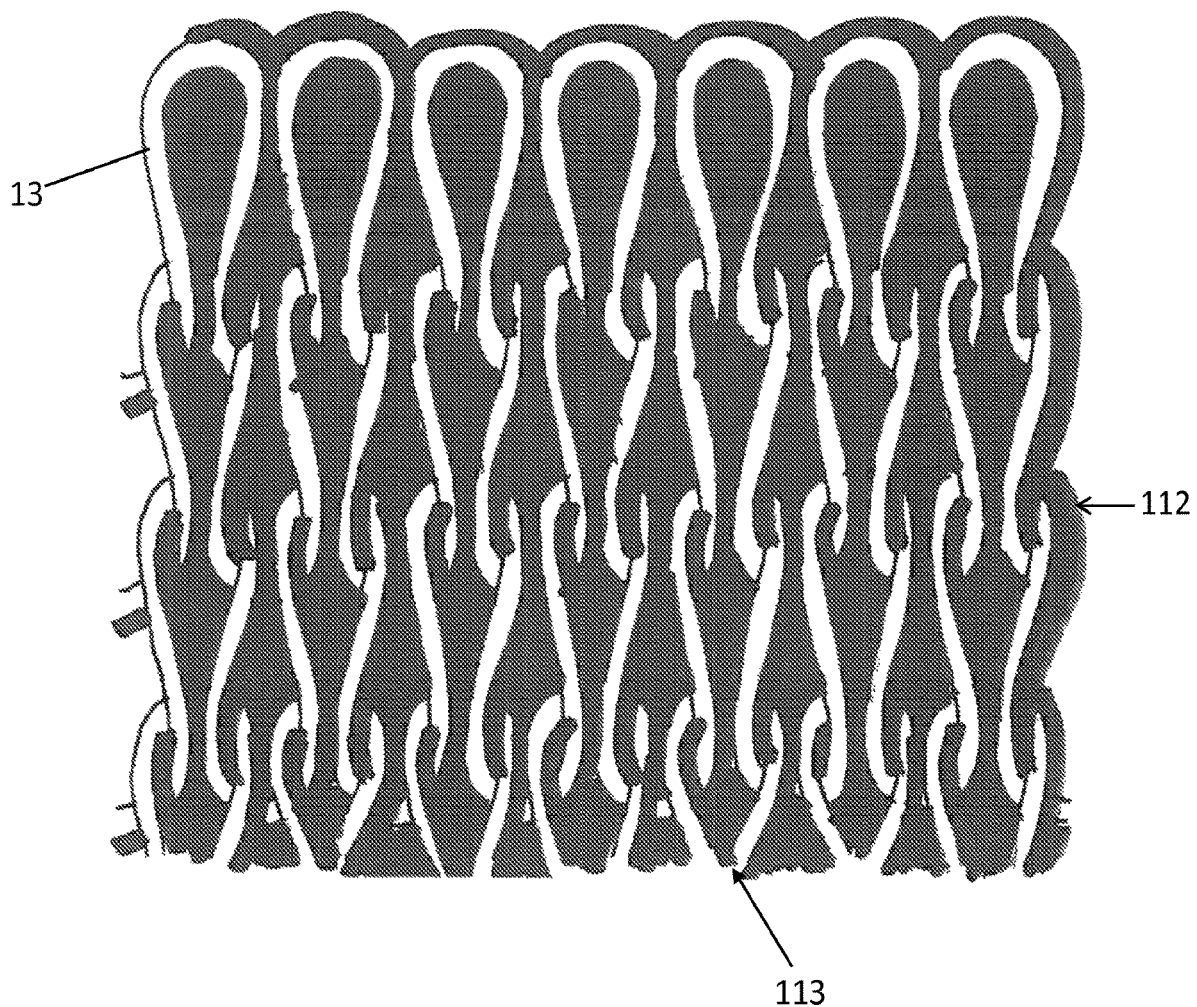
Figure 2C:
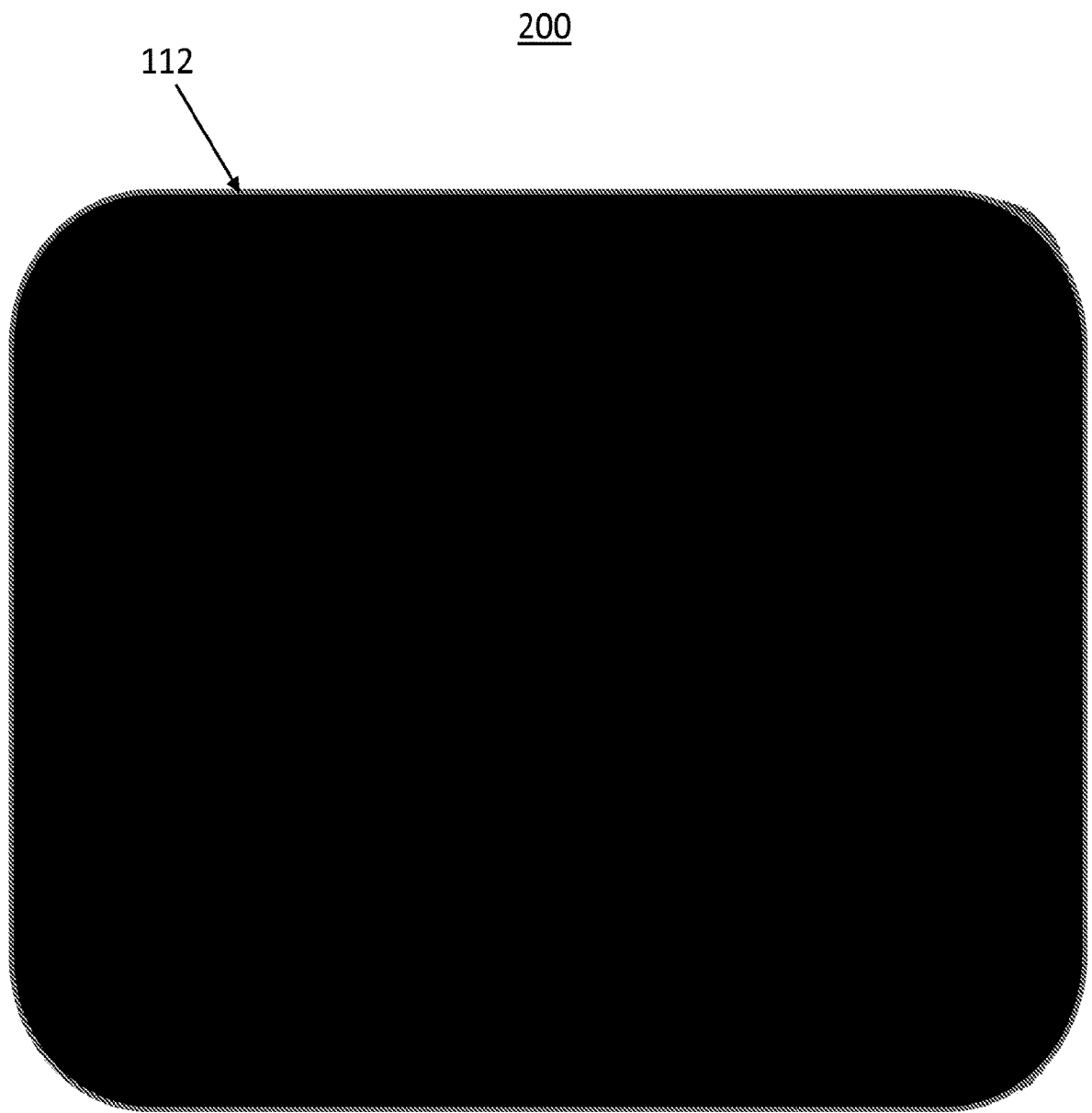
FIG. 2C shows the opposite of the construct shown in FIG. 2C.

As well understood by persons of skilled in the art, in weft knit plating the fabric is constructed by feeding two yarns to one set of needles ("single jersey" or "single knit") so that one orients and is arranged primarily on a first side 14 of the fabric and the other orients and is arranged primarily on an opposite, second side 16 of the fabric, as seen in FIGS. 2B-C and 3.1, for example. FIG. 3.1 is cross-sectional view of the textile construct 200. (FIG. 3.2 is a cross-sectional view of a sandwiched textile construct 300, which is discussed below.)

The inventive subject matter also encompasses multilayer textile, i.e., textile structures formed from multiple layers of knitted, woven or non-woven lattices of filaments. For example multilayer constructions may be achieved using forms of double-knit construction. Accordingly, the inventive subject matter provides a replacement for conventional, woven three-layered fabrics that are coated or laminated with a wind/water proof barrier. One possible implementation of three-layer construction contemplated by the inventive subject matter consists of an (1) outerwear shell fabric (e.g., a durable and/or aesthetic layer); (2) an intermediate layer of barrier film that may be a waterproof layer, a waterproof/breathable layer, or a wind resistance layer, etc.; and (3) an internal layer of liner fabric (e.g., a durable, insulation, and/or comfort layer). Using the teachings herein, such three-layer textiles come off the textile forming equipment, e.g., a knitting machine, without the need for more layers, such as the barrier layer, to be added in a post-textile formation steps. The barrier layer may correspond to film 112; the outer shell may correspond to side 14, and the inner liner may correspond to side 16.

Figure 6A:
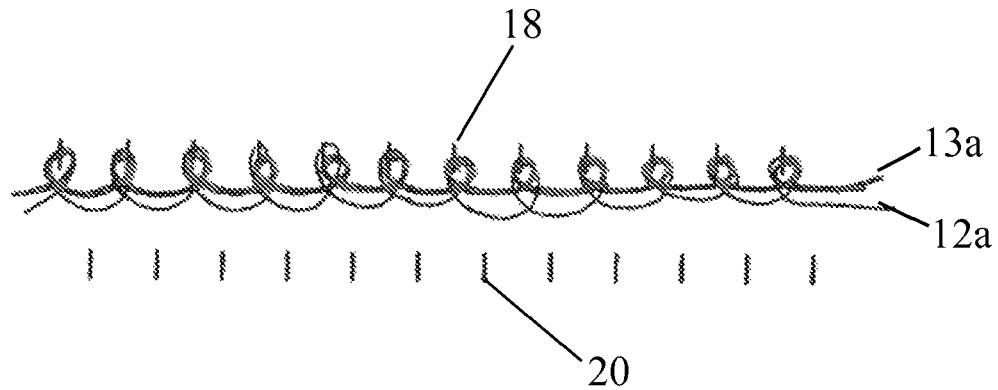
FIG. 6A shows the formation of a first plaited textile structure on the first set of needles.
Figure 6B:
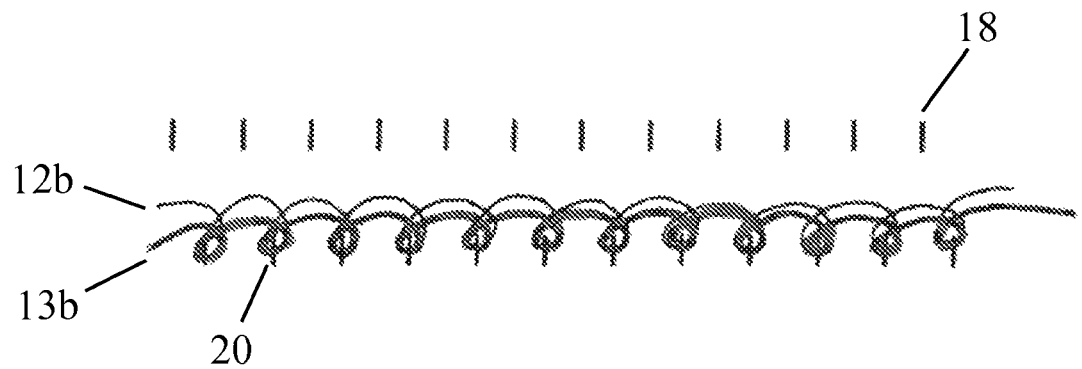
FIG. 6B shows the formation of a second plaited textile structure on a second set of needles.
Figure 6C:
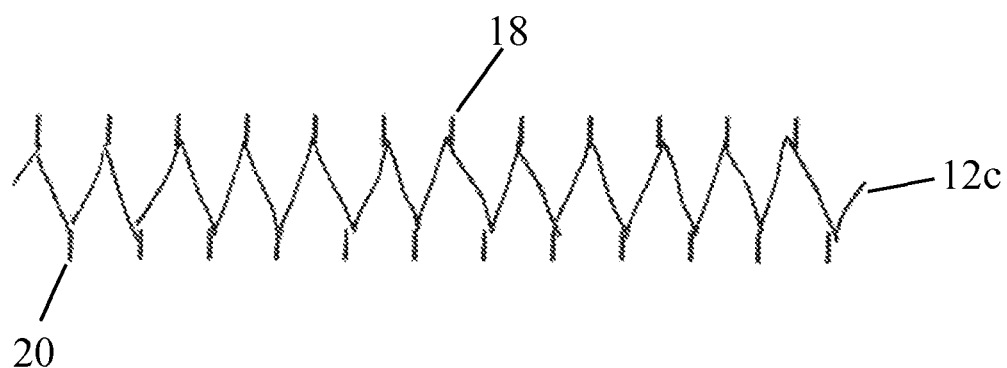
FIG. 6C shows a fusible filament used to interlock to the first and second plaited structures on the first and second needle sets shown in FIGS. 6A-6B.

FIGS. 6A-6D and 3.2 show an example of a three-layer sandwiched construction may created by using multiple sets of knitting needles, as in the known two-needle technique of double jersey knit construction, which is formed by laid-in knit construction. FIGS. 6A-D illustrate a scheme for constructing a three-layer fabric, as described above. First and second sets of needles 18, 20 are arranged to receive and manipulate filaments 12, 13 used in the construction of the layers. FIG. 6A shows the formation of a first plaited textile structure on the first set of needles. A first filament is paired with a second filament to form the plaited structure. The first filament may be a fusible yarn, such as a TPU yarn, and the second yarn may be a non-fusible yarn, such as polyester yarn. FIG. 6B shows the formation of a second plaited textile structure on the second set of needles. A first filament is paired with a second filament to form the second plaited textile structure. The first filament may be a fusible yarn, such as a TPU yarn, and the second yarn may be a non-fusible yarn, such as polyester yarn. FIG. 6C represents another filament 12 used in a tucking process to interloop with and couple to the first and second plaited structures on the first and second needle sets.

Figure 6D:
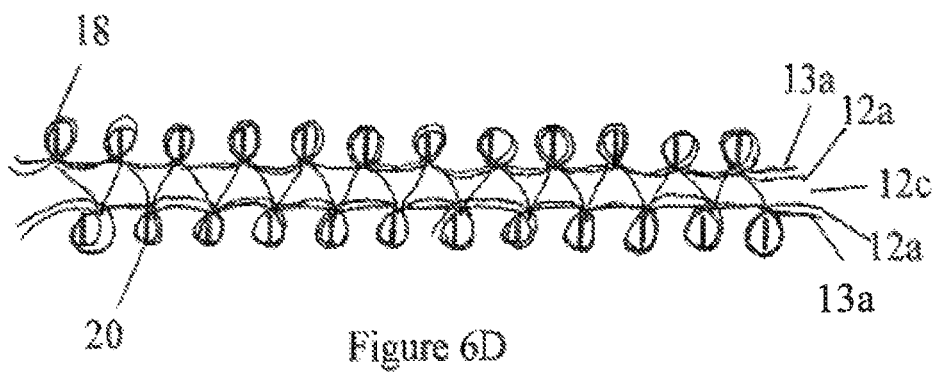
FIG. 6D shows the completed structure (still on needle sets) with an intermediate layer of the fusible filament, before fusion of that layer, based on the integration of structures shown in FIGS. 6A-6B.
Figure 7:
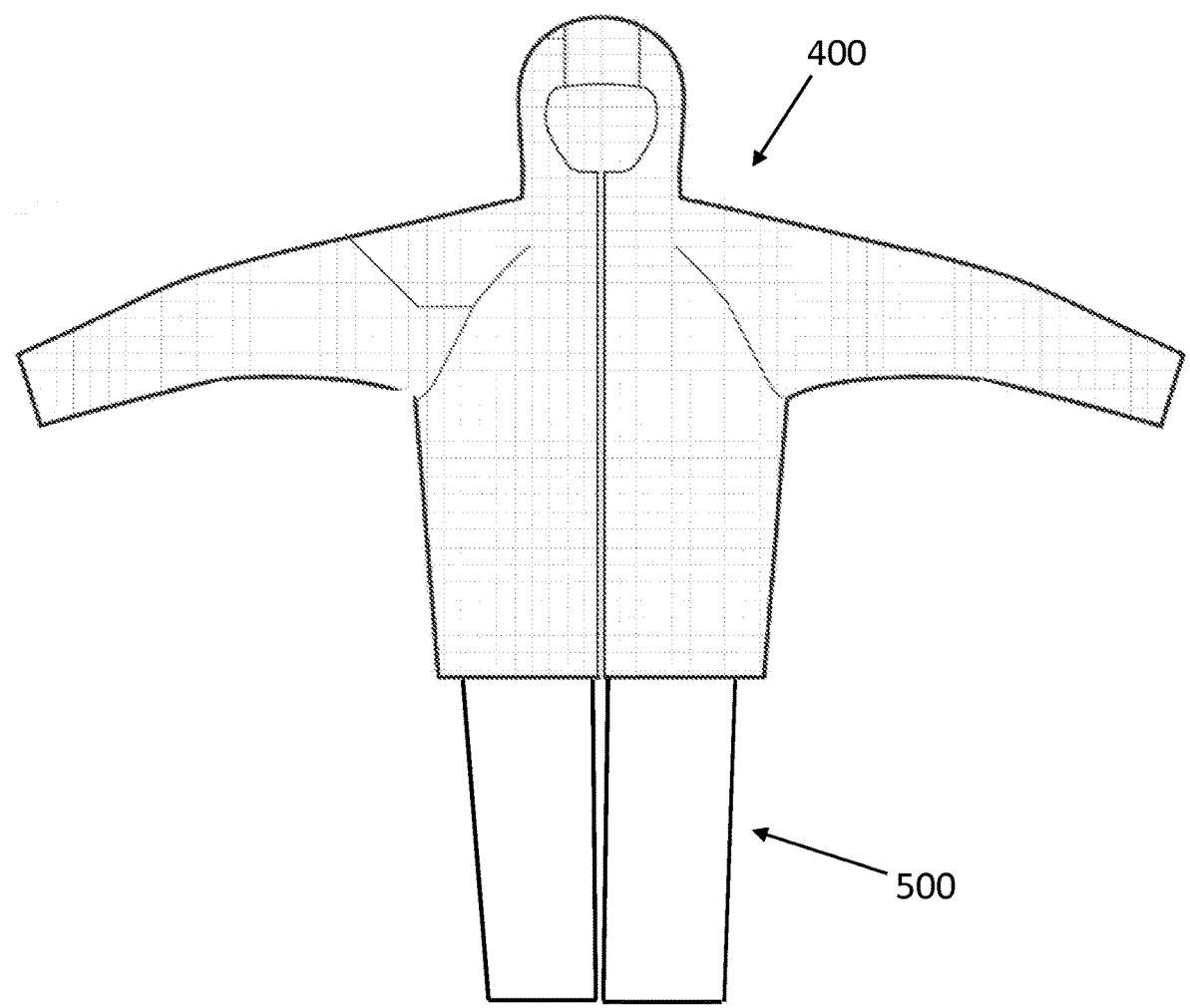
FIG. 7 shows an example of garments that may include a textile construct made according to the teachings herein.

FIG. 6D shows the completed structure (still on needle sets 18, 20) with an intermediate layer of the fusible filament, before fusion of that layer. The finished product of the double knit textile formation is then subjected to a fusing agent, such as heat, to create textile construct 300 (FIG. 3.2) with a fused film 112 and adjacent layers 113 with a discrete lattice structure.

The intermediate, film layer 112 of textile construct 300 is formed from the combination of fusible filaments 12a, 12b, and 12c used in the first plaited structure, the second plaited structure and the tucking layer. In some cases, the fusible filaments used in the plaited structures may be omitted in favor or non-fusible filaments 13a or 13b, and just the filaments 12c used for tucking provide the film 112 formation material. In other cases, the tucking filament 12c is non-fusible and just fusible filaments 12a or 12b in one or both of the first and second plaited structures provide the fusible material for film formation.

The filaments used to form the intermediate layer and the layers that are adjacent and outwardly disposed from the intermediate layer may each have the same or different filaments or properties from the intermediate layer and/or from each other. For example, fusible filaments 12 in the intermediate layer 112, and the first plaited textile structure (FIG. 6A) and second plaited textile structure (FIG. 6B) may be fused into a film that serves as a waterproof and breathable membrane. An adjacent outer layer 113 may be formed of filaments, e.g., yarns, which are suitable as a durable outer shell material for a garment. And an adjacent inner layer may serve as a layer that provides durability, comfort and/or insulation against the skin of a user of the garment. Further, use of multiple layers allows functional intermediate layers to be hidden from view so that more aesthetic materials to be used at the outer and inner sides of a garment. Other performance features that may be provided by the fusible layer of filaments in a textile construct of one or more layers not only include water resistance and breathability but also strength and insulation, fire retardancy, and other features.

In addition to knitting methods, the inventive subject matter also contemplates structures formed using woven and nonwoven techniques, e.g., woven double clothes and multilayered nonwovens.

Once the desired structure is created that selectively disposes fusible filaments 12 in a lattice structure substantially on one side or layer in a textile construct, the construct is subjected to an agent that causes fusion of fusible filaments the side or layer substantially at the side or layer where the fusible filaments are selectively oriented and arranged. The fusing agent may be a condition or a physical mechanism. For example, the transition from filaments to film may be promoted using thermal, electromagnetic, or electrical energy. Or it may be provided by reaction with a chemical or with a pressure applicator such as rollers.

As seen in the Figures, following action by the fusing agent, textile construct has a first side or layer 14 comprising a film 112 of fused material formed from the fusible filaments 12 and a second side or layer 16 in a substantially discrete lattice structure 113 of the non-fusible filaments 13. The second side 16 will be adjacent to and generally coextensive with the first side or layer. As a result of fusion bonding between the fused film and the discrete lattice structure, the overall structure of the textile may be referred to as a "unitary" structure. Unlike prior art textile constructs formed by bonding or fusing thermoplastic filaments into a structure of entirely one class or another (i.e., cross-sectionally a lattice form or film form, but not both), the inventive subject matter creates novel textile constructs that when taken in cross-section (see FIGS. 3.1 and 3.2) are hybrid lattice/film structures where the construct is a unitary structure that has a film of fused filaments on one side or layer and a discrete lattice structure on the other side or in adjacent layers. Such constructs may be referred to herein as "hybrid lattice/film" constructs.

As used in the preceding paragraph, "substantially" means that the non-fusible filaments 13 forming into the discrete lattice structure 113 do not themselves undergo an overall loss of their filamentous structure. The filaments and structure may undergo changes in dimension or shape so long as a discrete lattice structure remains. For example, the filaments in the discrete structure may undergo changes in cross-sectional shape, such as transitioning from circular cross sections to oval cross sections when subjected to heat. Similarly, the lattice structure may change dimensions or shapes, e.g., the openings may contract or expand when subjected to an agent that causes fusion and/or the geometrical shape of the openings may change.

In certain embodiments, the fused film 112 in a textile construct is a membrane that provides waterproofness and breathability to the construct according to one or more industry standards listed below. A range of degrees of waterproofness and/or breathability may be achieved empirically by varying the porosity of the film. Porosity may be controlled by one or more of the following: varying the density of openings in the knitted, woven or non-woven structure; controlling fusion conditions, such as time and temperature of melt; varying the size of filaments; varying the material properties of a filament, particularly the fusible filaments; and varying the number of filaments in a filament formed of a bundle of multiple filaments, particularly the fusible filaments; and/or varying the diameter of filaments in a filament formed from a bundle of filaments, particularly the fusible filaments. In some embodiments, a porosity for providing a breathable and waterproof membrane is achieved by providing a fusible filament formed from a bundle of multiple fusible filaments, the overall filament bundle having a denier of from 1 to about 170. Individual filaments in the bundle may have deniers ranging from 0.5, 1, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 160, 165, 170. Each filament bundle may have from 2-150 or more individual filaments of the same or different sizes, compositions, material properties, shapes and dimensions, and the individual filaments may be monofilaments or multifilament.

It is expected that a range of film thicknesses can be achieved using the teachings herein, including without limitation, film thicknesses of from 0.5 mm to about 3 mm.

Suitable fusible filaments include meltable filaments such as those formed of thermoplastic polyurethane (TPU) and others, as discussed in more detail below. TPU is renowned for its many potential attributed, including its water resistance and breathability, high elongation (stretch) and tensile strength; its elasticity; and, to varying degrees, its ability to resist oil, grease, solvents, chemicals and abrasion. TPU filaments may be formulated to provide textile constructs, and finished products using the constructs, that, among other things, have lightweight, softness, suppleness, good drape, and comfortable stretchability, as well wind resistance and waterproofness. TPU filaments may be selected to provide glass transition temperatures in the range of about 110 degrees C. to about 160 degrees C., which allows for use with non-fusible filaments that may degrade under higher temperatures. The flowability of melting polymer is expected to increase by increasing the number of filaments in a bundle, the filament size, and/or by selecting filaments having relatively low glass transition temperatures. Therefore, degrees of waterproofness, wind resistance and breathability may be engineered into products in desired locations by controlling the film formation process.

Fusible filaments according to the inventive subject matter may be a combination of thermoplastic materials. The filaments may have other components such as dyes and other finishing agents used in textile processing. In some embodiments, the filaments may be impregnated with microscale or nanoscale particles that are, for example, volatile components that are driven out of films to create desired porosities or other properties. In other cases, the impregnated particles may be conductive particles to impart conductivity to films for use in or as electrical circuits or devices.

To achieve a stable and well-formed unitary construction for the textile construct, it may be desirable to match the indices of shrinkage and/or stretchability for fusible and non-fusible fibers with each other so that there is no delamination, tearing, separation or fracture at the material interfaces following fusion. For example, the materials should be matched sufficiently so that they will elastically elongate without tensile failure at about the same rates in areas of the textile construct in a finished product that are subject to stretch. It is expected that suitable matching may be achieved by materials that have stretchability (elongation) values to tensile failure that under given test conditions are within 40%, 30%, 20%, 10%, 5%, or 0% of each other. Similarly, materials may shrink under various conditions, including washing, heat, or cold. Similar matching of materials may be needed to ensure that shrinkage does not cause damage from delamination, tearing, separation or fracture at the material interfaces following fusion. It is expected that suitable matching may be achieved by materials that have shrinkage values under given conditions that are within 40%, 30%, 20%, 10%, 5%, or 0% of each other.

The construct may be provided with a range of elasticity or conversely rigidity by selecting filaments having desired material properties. A range of overall material properties for the construct may be achieved by selectively using such filaments as the fusible or non-fusible filaments, or as filaments in a bundle of multiple filaments forming a fusible or non-fusible filament. The filaments may be of microscale or nanoscale diameters, namely from 1-100 nanometers, or larger.

In certain embodiments, the innovative textile constructs are three-dimensionally shaped (i.e., non-planar) textile constructs for use in a variety of products, such as apparel, footwear, or equipment (e.g., backpacks, tents, etc.) products. The formation of three-dimensional textile constructs with performance films allows for seamless construction of articles, such as waterproof-breathable jackets, that conventionally required seamed connections of sections of the barrier films.

Published US Applications US20130255103 and 20130260629 relate to textiles that include sections of film formed from melted yarns and are hereby incorporated by reference in their entireties for all purposes. In contrast to the inventive subject matter, the referenced applications do not teach or suggest the novel textile constructs of the present inventive subject matter wherein, for example, the textile constructs are formed to provide a film on one side or layer of the construct and a discrete lattice structure on the opposing or adjacent side or layer. Therefore, the textile constructs of the published patent applications require additional assembly steps and materials to achieve the full functionality of the inventive subject matter. Nonetheless, the published patent applications include useful background information on general textile technology that may be adapted for use in the inventive subject matter, as conveyed by the following passages.

Although the yarns, threads, and textiles are disclosed below as being incorporated into various articles of apparel (e.g., outerwear, shirts and footwear), for purposes of example, the textile constructs may also be incorporated into a variety of other articles. For example, the textile constructs may be used in seamless and seamed products and components of products, including, without limitation, apparel, footwear, tents, backpacks, and containers, and upholstery for furniture. The yarns, threads, and textiles may also be utilized in bed coverings, table coverings, vehicle coverings, tarps, and towels.

Various configurations of the textile constructs may also be utilized for industrial purposes, as in automotive and aerospace applications, filter materials, medical textiles, geotextiles, agrotextiles, and industrial apparel. Accordingly, the textile constructs may be utilized in a variety of articles for both personal and industrial purposes.

Textiles may be defined as any manufacture from filaments having a generally two-dimensional structure (i.e., a length and a width that are substantially greater than a thickness). In general, textiles may be classified as non-woven textiles or mechanically-manipulated textiles. Non-woven textiles are webs or mats of filaments that are bonded, fused, interlocked, or otherwise joined. As an example, a non-woven textile may be formed by randomly depositing a plurality of polymer filaments upon a surface, such as a moving conveyor. Mechanically-manipulated textiles are often formed by weaving or inter-looping (e.g., knitting) a yarn or a plurality of yarns, usually through a mechanical process involving looms or knitting machines. Whereas woven textiles include yarns that cross each other at right angles (i.e., warp and weft yarns), knitted textiles include one or more yarns that form a plurality of intermeshed loops arranged in courses and wales.

A fusible or non-fusible filament 12 or 13 and a section thereof are depicted in FIGS. 4 and 5. The filament shown is a yarn. However, that configuration is merely illustrative and other filament forms are possible. In general, yarn 12 or 13 may be used for a variety of purposes, including sewing, stitching, and embroidering. Yarn 12 or 13 may also be utilized for making a thread, cable, cord, or rope. Various textiles may also be produced from yarn 12 or 13 through weaving and knitting, for example. Although a relatively short length of yarn 12 or 13 is shown, yarn 12 or 13 may have a significantly greater length. More particularly, the length of yarn 12 or 13 may significantly exceed one-thousand or even ten-thousand meters. Depending upon the manner in which yarn 12 or 13 is formed, yarn 12 or 13 may be a spun yarn or an air-textured yarn and/or core spun multifilament yarns where the core yarn may shrink. This yarn has a monofilament core which has a controlled amount of shrinkage of 5%-40%, or of 5%-15%, or thereabout, wrapped around the mono filament core is a multifilament textured yarn. During the application of heat and pressure the TPU yarn will melt & shrink and the hard yarn will shrink to a lesser extent, closing up the pores of the knit structure to obtain a low air porosity, i.e., to block the amount of air/wind that is allowed to go through the fabric.

In the example of FIGS. 4-5, filament 12 or 13 is a yarn formed from a plurality of filaments 1 that are bundled or otherwise gathered to form a generally thin and elongate structure. The number of filaments 1 that are incorporated into yarn 12 or 13 may vary significantly and may range between two and three hundred or more. Fibers are often defined, in textile terminology, as having a relatively short length that ranges from one millimeter to a few centimeters or more, whereas filaments are often defined as having a longer length than fibers or even an indeterminate length. As used herein, the term "filament" or variants thereof is intended to encompass lengths of both fibers and filaments from the textile terminology definitions. Accordingly, filaments 1 or other filaments referred to herein, may generally have any length. As an example, therefore, filaments 1 may have a length that ranges from one millimeter to hundreds of meters or more. Individual filaments 1 may also have lengths that extend through an entire length of yarn 12 or 13. Filaments 1 may be substantially aligned or they may have a twist or rotational arrangement in an overall bundle.

In some embodiments according to the inventive subject matter, the fusible filaments 12 are primarily formed from a thermoplastic polymer material. In general, a thermoplastic polymer material softens or melts when heated and returns to a solid state when cooled. More particularly, a thermoplastic polymer material transitions from a solid state to (1) a softened state when heated to a glass transition temperature of the thermoplastic polymer material and (2) a generally liquid state when heated to a melting temperature of the thermoplastic polymer material. Then, when sufficiently cooled, the thermoplastic polymer material transitions from the softened or liquid state to the solid state. As such, the thermoplastic polymer material may be softened or melted, molded, cooled, re-softened or re-melted, re-molded, and cooled again through multiple cycles. When heated to at least the glass transition temperature, thermoplastic polymer materials may also be welded, fused, or thermally bonded, as described in greater detail below, to join an element formed from the thermoplastic polymer material to another object, item, or element. In contrast, with thermoplastic polymer materials, many thermoset polymer materials do not melt when heated, instead simply degrading or burning.

Although a wide range of thermoplastic polymer materials may be used for fusible filaments, examples of suitable thermoplastic polymer materials include thermoplastic polyurethane, polyamide, polyester, polypropylene, and polyolefin. Although fusible filaments may be formed from any of the thermoplastic polymer materials mentioned above, utilizing thermoplastic polyurethane imparts various advantages. For example, various formulations of thermoplastic polyurethane are elastomeric and stretch over one-hundred percent, while exhibiting relatively high stability or tensile strength. In comparison with some other thermoplastic polymer materials, thermoplastic polyurethane readily forms thermal bonds with other elements, as discussed in greater detail below. Also, thermoplastic polyurethane may form foam materials and may be recycled to form a variety of products.

Emerging technology now has resulted in thermoplastic poly(tetrafluoroethylene) (PTFE), and meltable fibers made therefrom, which may be adapted for use in forming membranes in constructs according to the inventive subject matter. For example, U.S. Pat. Nos. 8,329,839, 6,737,165, 6,207,275, and 5,552,219 teach thermoplastic polymers and fibers that are based on copolymers with a majority of the copolymer being formed of PTFE. The aforementioned patents are incorporated by reference in theft entireties for all purposes. For example, it is contemplated, however, that the PTFE may include minor amounts of one or more co-monomers such as hexafluoropropylene, perfluoro(methyl vinyl ether), perfluoro(propyl vinyl ether), perfluoro(2,2-dimethyl-1,3-dioxole), and the like, provided, however that the latter do not significantly adversely affect the stability of the PTFE homopolymer for the intended environment. In some applications, the amount of co-monomer does not exceed about 7 weight percent, and in others the PTFE has less than about 1 weight percent of co-monomer. In other embodiments, the amount of co-monomer does not exceed about 3 mole percent (herein "mol %"), and in other embodiments, it is less than about 1 mol % or less than 0.5 mol %. An indication of the thermoplastic flow behavior of the polymer can be readily analyzed with the commonly employed method of the determination of a melt-flow index (MFI). The latter method, for the present PTFE's is conveniently and reproducibly carried out according to ASTM test D1238-88, at 380° C. under a load of 21.6 kg, herein referred to as the melt flow index or alternatively MFI (380/21.6). Under these experimental conditions, and in a maximum extrudate-collection time of 1 hr, conventional ultra-high molecular weight PTFE grades have an MFI of zero. In contrast, the PTFE grades according to inventive subject matter have a non-zero MFI (380/21.6) in a maximum extrudate-collection time of 1 hr. More preferably, the PTFE's are characterized by an MFI (380/21.6) of greater than about 0.005, more preferably of greater than about 0.2 g/10 min and most preferably of greater than 0.25 g/10 min. The maximum value of the melt-flow index of the PTFE grades used in the present invention depends on the particular end product and processing technique. An upper value of the MFI of about 10 g/10 min is preferred for most applications in which the polymer solid is substantially isotropic; more preferred is an upper value of the MFI of about 5 g/10 min, and most preferred is 2.5 g/1.0 min.

As further elaborated upon below, the presence or absence of molecular orientation is readily established by heating the article to a temperature that is above its melting temperature. In embodiments in which the PTFE grades are employed in articles which are produced under processing conditions involving extensional or shear flow, and display orientation of the polymer molecules as defined above, the PTFE grades are characterized by a preferred range of the melt flow index of an upper limit of 200 g/10 ruin; more preferred the upper limit is about 75, and most preferred 50.

If in this case the PTFE grades according to the present invention comprise a relatively high content of co-monomer the upper limit of the MFI range of the preferred grades could be higher. For example, if the PTFE contains up to 3 mol % of co-monomer, the upper limit of the MFI range could extend up to about 25 g/10 min, and a preferred range would be between 0.1 up to about 15; when the co-monomer content is about 1 mol % or less, the MFI range may extend up to about 15 g/10 min, more preferably the MFI range would be between 0.1 up to about 10 g/10 min; and at a content of 0.3 mol % or less the suitable MFI the preferred range would not exceed about 5 g/10 min and more preferably would have an MFI value in the above-noted range for PTFE polymers. In the event the PTFE comprises a co-monomer and is oriented even higher MFI index could be useful including MFI ranges up to about 300 g/min and more preferably 250 g/min or less.

In another embodiment of the present invention, the PTFE grades are employed in articles which are typically produced under processing conditions involving extensional or shear flow, such as fibers spun from the melt at a spin stretch factor greater than 1, extrusion through conical dies, and the like. Generally, these processes result in articles that are not substantially isotropic, and display orientation of the polymer molecules in one or more directions. For example, in fibers spun under conditions involving extensional flow, the polymer molecules typically elongate and orient into the direction of the fiber axis. In melt-blown films, the polymer molecules commonly are elongated and oriented in the plane of the film. The presence or absence of preferred orientation of polymer molecules in finished articles, such as the above referred fibers and films, can readily be established by heating the product to, for example, 10° C. above its melting temperature, at which point elongated and oriented polymer molecules return to their relaxed isotropic state. The latter process results in macroscopic change of shape of the product. As an example, a fiber, in which the polymer molecules are oriented along the fiber axis, will shrink along its long axis and increase in diameter, upon heating of that fiber to a temperature that is above its melting temperature. For the purpose of the present invention, articles are said to be oriented when, upon heating to a temperature that is 10° C. above its melting temperature, after melting the article displays a change in size of at least 5% in at least one dimension. In embodiments in which the PTFE grades are employed in articles which are produced under processing conditions involving extensional or shear flow, and display orientation of the polymer molecules as defined above, the PTFE grades are characterized by a preferred range of the melt flow index of an upper limit of 200 g/10 min; more preferred the upper limit is about 75, and most preferred 50.

The PTFE grades according to the inventive subject matter display good melt stretchability, which is highly beneficial for, among other things, manufacturing of films, fibers, generally thin-walled structures, and the like. As understood herein, melt stretchability means the ability of a melt of the polymer to be stretched without breaking at practically useful rates. Thus, herein, a melt of the PTFE grades of good melt stretchability used according to the inventive subject matter is defined as a melt, that is extruded at 380° C., that has a spin stretch factor (SSF) of more than about 1.1, and more preferred more than about 1.2, measured at a stretching rate of 10%/sec. Under the above conditions, common PTFE grades cannot be extruded, and, thus, do not have a value of the spin stretch factor, as defined herein. Furthermore, unlike melts of common PTFE grades, melts of the PTFE grades of the present invention can be stretched at surprisingly high rates without failure, for instance at rates greater than 10%/sec, preferably between 50 up to 5000%/sec, and most preferably 100%/sec up to 2500%/sec or more. These melt stretchability characteristics are highly beneficial for, among other things, high speed and economical manufacturing of films, tapes, fibers, generally thin-walled structures, and the like. It is contemplated that PTFE melts are stretchable at stretching rates of more than 10%/sec, at more than 50%/sec, and at more than 100%/sec. Values as high as 1090%/sec are expected.

In some embodiments, the PTFE grades according to the inventive subject matter may be characterized by an MFI (380/21.6) between about 0.25 to about 200 g/10 min and a degree of crystallinity of once-molten and recrystallized unoriented material of between about 5% and about 60%. More preferably, the PTFE polymer is a polymer having a single peak melting point temperature which is above 325° C. and is preferably a homogenous blend of polymers and/or homopolymer.

The PTFE grades according to the inventive subject matter may be synthesized according to standard chemical methods for the polymerization of tetrafluoroethylene as described in detail in the literature (for example, W. H. Tuminello et al., Macromolecules, Vol. 21, pp. 2606-2610 (1988)) and as practiced in the art. Additionally, PTFE grades according to the inventive subject matter can be prepared by controlled degradation of common, high molecular weight PTFE or low co-monomer content copolymers thereof, for example by controlled thermal decomposition, electron beam, gamma- or other radiation, and the like (Modern Fluoropolymers, J. Scheirs, Ed. Wiley (New York), 1997 the entire disclosure of which is hereby incorporated by reference). Furthermore, the PTFE grades according to the inventive subject matter can be manufactured by blending of, for example, high melt-flow index grades with appropriate amounts of one or more grades of a lower, for instance below 0.5 g/10 min, or zero melt-flow index to yield homogeneously blended materials with values of the melt-flow index, viscosity or crystallinity in the desired range. The latter, in effect bimodal, trimodal or blends of even higher modality, and generally, PTFE grades with a broad molecular weight distribution, are particularly beneficial for use in processing schemes that involve elongation or shear flow, such as melt-spinning of fibers at spin stretch factors greater than 1, extrusion through conical dies, and the like. Due to the relatively simple nature of the MFI-testing method, viscosity measurement and crystallinity determination, using, for example, these analytical tools, those skilled in the art of polymer blending can readily adjust the relative portions of the different PTFE grades to obtain the melt-processable, thermoplastic PTFE compositions suitable for use in textile constructs according to the inventive subject matter.

In many configurations of a fusible yarn, each of the bundled component filaments 1 are entirely or substantially formed from one or more thermoplastic polymer materials. That is, at least 50%, 55%, 60%, 65%, 70%, 75%, 80%, 85%, 90%, 95%, or 100% by weight of a filament 1 is a thermoplastic polymer material. Advantages of substantially forming filaments 1 from a thermoplastic polymer material are uniform properties, the ability to form thermal bonds, efficient manufacture, elastomeric stretch, and relatively high stability or tensile strength. Although a single thermoplastic polymer material may be used, individual filaments 1 may be formed from multiple thermoplastic polymer materials. As an example, an individual filament 1 may have a sheath/core configuration, wherein an exterior sheath of the individual filament 1 is formed from a first thermoplastic polymer material, and an interior core of the individual filament 1 is formed from a second thermoplastic polymer material. As a similar example, an individual filament 1 may have a bi-component configuration, wherein one half of the individual filament 1 is formed from a first thermoplastic polymer material, and an opposite half of the individual filament 1 is formed from a second thermoplastic polymer material. Although each of filaments 1 may be formed from a common thermoplastic polymer material, different filaments 1 may also be formed from different materials. As an example, some of filaments 1 may be formed from a first type of thermoplastic polymer material, whereas other filaments 1 may be formed from a second type of thermoplastic polymer material.

The thermoplastic polymer material of filaments 1 may be selected to have various stretch properties, and the material may be considered elastomeric. Depending upon the specific properties desired for yarn 12, filaments 1 may stretch between ten percent to more than eight-hundred percent prior to tensile failure. As a related matter, the thermoplastic polymer material utilized for filaments 1 may be selected to have various recovery properties. That is, yarn 12 or filaments 1 may be formed to return to an original shape after being stretched. Many products that incorporate yarn 12, such as textiles and articles of apparel formed from the textiles, may benefit from properties that allow yarn 12 to return or otherwise recover to an original shape after being stretched by one-hundred percent or more. Although many thermoplastic polymer materials exhibit stretch and recovery properties, thermoplastic polyurethane exhibits suitable stretch and recovery properties for various textiles and articles of apparel.

The weight of yarn 12 may vary significantly depending upon the thicknesses of individual filaments 1, the number of filaments 1, and the specific material selected for filaments 1, for example. In general, weight is measured by the unit "tex" or "denier", which are weights in grams of a certain number kilometers of yarn, as understood by persons skilled in the art.

A variety of conventional processes may be utilized to manufacture yarn 12 or 13. In general, a manufacturing process for yarn 12 or 13 includes (a) extruding or otherwise forming a plurality of filaments 1 from a thermoplastic polymer material and (b) collecting or bundling filaments 1. Once bundled, filaments 1 may be twisted. Depending upon the specific characteristics desired, yarn 12 or 13 may also be subjected to an air texturing operation or other post-processing operations. Fusing processes, as discussed below, may also be performed to form thermal bonds between adjacent filaments 1.

Textile Constructs

As an example, a knitted textile 10 includes at least one pair of filaments 12, 13 that forms a plurality of intermeshed loops. More particularly, sections of the filaments form various loops that extend through and are intermeshed with other loops to define a variety of courses and wales. As depicted in FIG. 1, for example, the courses are horizontal rows of loops formed from the paired filaments, and the wales are vertical columns of loops formed from the filaments. In knitted textile constructs, the filaments are manipulated through a knitting process, which may involve a knitting machine, to form and intermesh the loops, thereby defining the various courses and wales. Although a relatively simple plaited knit structure is depicted, numerous plaited and non-plaited warp knit and weft knit structures may be formed through flat knitting, wide tube circular knitting, narrow tube circular knit jacquard, single knit circular knit jacquard, double knit circular knit jacquard, double needle bar raschel, warp knit jacquard, and tricot, for example.

Although the knitted textile depicted in the Figures is formed as a plaited structure from paired filaments 12, 13, multiple paired strands may be incorporated into the structure of knitted textile 10. For example, different loops, different courses, different portions of a single course, different wales, and different portions of a single wale may be formed from strands having diverse materials, colors, and properties.

As a another example of a textile, a woven textile (not shown) may be constructed wherein warp strands extend in a first direction and weft strands extend in a second direction that is substantially perpendicular to the first direction Moreover, the warp and weft strands cross each other and weave over and below each other. The strands are manipulated through a weaving process, which may involve a weaving machine or loom, to cross and weave among each other at the substantially right angles. There are 3 main weave constructions that make up all woven fabrics: 1—plain, 2—twill, 3—sateen or satin. In addition to a plain weave, various configurations of woven textile may have a twill weave, satin weave, jacquard weave, or dobby weave, for example. As one possibility, using a double cloth woven construction, a TPU yarn or other fusible filament may be sandwiched in the middle of a fabric to add performance characteristics to the material.

A woven textile is not limited to a specific set of fusible warp and/or weft strands; one or more additional strands may be incorporated into the structure of woven textile. For example, different warp strands, weft strands, or portions of these strands may be formed from various types of strands having diverse materials, colors, or properties. Any of the woven or knitted strands may have the configuration of most any kind of filament, e.g., yarn, thread, cable, cord, or rope. As such, at least 50%, 55%, 60%, 65%, 70%, 75%, 80%, 85%, 90%, 95%, or 100% by weight of a woven or knitted construct may be a thermoplastic polymer material, such as thermoplastic polyurethane. When strands are formed as a filament, cable, cord, or rope, such strands may also be substantially formed from a thermoplastic polymer material.

Thermal Fusing & Bonding

Thermal fusing and bonding is an advantage of thermoplastic polymer materials not generally present in yarns, threads, and textiles, for example, formed from natural materials (e.g., cotton, silk) and thermoset polymer materials. A thermoplastic polymer material softens or melts when heated and returns to a solid state when cooled. In addition to permitting molding or shaping, an element formed from a thermoplastic polymer material may also be welded, fused, or thermal bonded to another object, item, or element. That is, the thermoplastic polymer material may be used to join thermoplastic elements or thermoplastic and non-thermoplastic elements together through thermal bonding. The inventive subject matter is directed to textile constructs made of fusible filaments. In terms of formation of films from fusible filaments, a fusible filament is transformed from a discrete filamentous structure into a film wherein the discrete filamentous structure of individual filaments is lost and the original lattice structure of the knitted, woven or nonwoven filaments is converted into a general film form with a substantially contiguous surface of the fused filaments. A lattice structure in which filaments are maintained in substantially a discrete form, i.e., one where (1) the filament structure is still visible, although there may be transformation of the shape or dimensions of the filaments; and (2) where there is still a substantial lattice structure preserved, is not intended to be considered a film formed of fused filaments, even if there is thermoplastic bonding of filaments at crossover points.

One of the factors affecting the degree of bonding or fusing is temperature and, optionally, pressure. As noted above, a thermoplastic polymer material transitions from a solid state to (a) a softened state when heated to a glass transition temperature of the thermoplastic polymer material and (b) a generally liquid state when heated to a melting temperature of the thermoplastic polymer material. Thermal bonding may occur when the thermoplastic polymer material is heated to the glass transition temperature. Greater degrees of thermal bonding, as discussed below, may occur at elevated temperatures approaching or exceeding the melting temperature.

As noted earlier, unlike prior art textile constructs formed by bonding of fusing thermoplastic filaments, the inventive subject matter creates novel textile constructs that are unitary, hybrid structures of a lattice formed from filaments and a film ("hybrid lattice/film" constructs). The hybrid lattice/film constructs may be one or more regions in a larger construct consisting of a plurality of distinct regions. For example, a textile construct may have one or more regions of hybrid lattice/film constructs that are combined with one or more regions in the same and/or different planes that consist of (1) a lattice structure (e.g., a knit or woven textile structure); and/or (2) a non-lattice structure, e.g., a film of thermoplastic materials, which may or may not have been formed from a lattice made entirely of fusible filaments that are melted to create the film. Where a textile construct has multiple regions, the properties of the regions may be different from the properties of another region based on variations in material properties, materials used, geometrical and physical arrangements of filaments, lattice structures and film structures. Examples of properties that may be varied through the hybrid/lattice regions and/or other regions include permeability, stretchability, and durability.

Permeability generally relates to ability of air, water, and other fluids (whether gaseous or liquid) to pass through or otherwise permeate a textile construct. Depending upon the degree to which the fusible filaments are fused to each other, the permeability may vary significantly. In general, the permeability is highest in areas of a hybrid lattice/film construct where the fused filaments are fused the least or where the fusible filaments are made of material that allows diffusion of fluids. Conversely, the permeability is lowest in areas of the construct where filaments are fused the most. As such, the permeability may vary along a spectrum depending upon the degree to which filaments are fused to each other and/or based on material choices. Due to the transformation of filaments to a non-filamentous state, which effectively is a solid or low porosity polymer sheet, the hybrid lattice/structure may be an effective barrier against penetration of water or other substances. The barrier film 112 may be engineered as a membrane that selectively restricts the passage of liquid phase water, but allows the passage of vapor phase water. And the barrier may be a full or partial wind block. Because the lattice structure is retained on one side or adjacent layer, the barrier layer may be combined with all the benefits of traditional knit or woven constructions, such as comfort, insulation, aesthetics, and durability.

There are various known industry standards known to persons skilled in the art for evaluating textile constructs for waterproofness or water resistance and/or breathability. Accordingly, using the teachings herein, persons skilled in the art are expected to be able to engineer hybrid lattice/film constructs that meet one or more of the following standards:

Low range hydrostatic—AATCC127 (Option 2) or JIS L1092; (Method A), ≥2000 mm or as claimed;
High range hydrostatic—ASTM D751 (Fed Std 191-A55), ≥25 spi;
MVTR (upright)—ASTM E96B, 700 grams/meter square/24 hours minimum;
MVTR (inverted)—JIS L 1099 (Method B); and
Air Permeability—ASTM D737, 1.0-15.0 CFM Durability generally relates to the ability of a textile construct to remain intact, cohesive, or otherwise undamaged, and may include resistances to wear, abrasion, washing, and degradation from chemicals and light. Depending upon the degree to which filaments in a hybrid lattice/film construct are fused to each other, the materials used, the dimensions of the materials, and/or the structural arrangements chosen, the durability of the textile construct may vary significantly. The stretchability of the textile construct may also be varied along similar lines, as persons skilled in the art will appreciate.

As already noted, textile constructs according to the inventive subject matter may be incorporated into a variety of products, including various articles of apparel (e.g., shirts pants, footwear). Taking a set of outer garments consisting of a jacket or shell 400 and pants 500 (FIG. 7) as an example, a textile construct may form a majority of each garment, including a torso region and two arm regions for the jacket or shell and a waist and leg regions for the pants. One or more textile constructs may be selectively placed in areas where any of the aforementioned or performance attributes may be desired. For example, in a wind and rain jacket, the rainproof properties/performance areas may be on the front & back & shoulders, while more breathability and less waterproofness areas would be under the arms. Further, because the film component is based on a knit, woven or nonwoven process, some or all portions of a garment may be constructed using 3D and/or seamless constructions possibly through such textile formation techniques. This is not possible in conventional processes where the barrier film is applied in a separate lamination process. In the case of finished products that are body-covering garments, gloves, headwear, or footwear, the forming of a pre-fusion textile construct into a desired hybrid lattice/film construct may be accomplished by either a heated three dimensional mannequin corresponding to the body parts intended to be covered by the textile construct.

Thermoplastic fusible filaments may be heated to glass transition or melt temperatures by any of various known means, including ovens, steam presses, irons, heat guns, etc. In addition to thermal apparatuses that cause transformation of fusible filaments into films, other apparatuses or energy sources may be used to cause transformations into films, alone or in combination with thermal energy. For example, mechanical presses may be used to facilitate the formation of a film by using filaments that have wax or clay like properties under sufficient conditions and agglomerate and fuse under sufficient pressure. The filaments may also be polymerizable materials that can bond together in the presence of polymerization agent such as a chemical agent or energy source (e.g., electromagnetic radiation in UV or IR spectrum or ultrasonic energy). The filaments may also be of a nature that they soften and become fusible in the presence of a particular solvent or gas.

In addition to main body portions of garments, many other features may be formed into the knit structure, with as minimal seams or other separate process steps. These features could include pockets, shaping darts, buttonholes, trim effects, fully shaped panels and other stitch constructions.

Further, the inventive subject matter provides an advanced, eco-friendly technology because it eliminates or reduces cutting waste, pattern making, and post-manufacturing processes.

As an additional example of the inventive subject matter, a knitting scheme for a textile construct with a sandwiched construction of inner and outer knit layers of non-fusible yarn, e.g., polyester, and an intermediate layer of a fusible yarn, such as TPU, is shown in FIGS. 8A to 9B. The intermediate layer may be fused into a barrier layer, as with other embodiments discussed above. The embodiment shown is intended to illustrate that the inner fabric (backside skin facing side or technical reverse) and/or the outer knit layer (e.g., facing away from skin) may be formed with a plurality of portals or voids that expose the intermediate layer. A great range of patterns or voids may be created. A jacquard knitting process may be used to create desired patterns in a layer adjacent the intermediate layer. FIG. 8B illustrates the general principles of construction of the intermediate layer and the front and backside layers, with loops and interlocks indicated at needle positions represented by the series of parallel line segments above and below the knit front and back layers. (FIG. 8B shows a general construction for the construct of FIG. 8A but it does not correspond exactly to the construct of FIG. 8A.)

FIG. 8C illustrates two forms of interlock knit constructions that are used in the construction of FIG. 8A or FIG. 8B. The interlocks are technically the same but illustrate differently. The interlocking yarn may be considered a spacer yarn between the back and face fabric layers in a double knit construction. The spacer yarn may also be referred to as a "timber yarn".

FIG. 8D illustrates an arrangement of tuck and knit interlocks that may be used in the intermediate layer of the construct of FIG. 8A. FIG. 8D shows use of a combination of the two stitch types from 8C to join the front and back stitches together, which will form the fused film. FIG. 8D is a simplified version of what is shown in FIG. 8B, but in FIG. 8B the construct has the face and the back loops added to the diagram. This all highlights that the construct may use a combination of knit stitches (e.g., knit and tuck) to form the fusible layer. By knitting some of the fusible fiber yarns into the construct, there can be a more sound construction. While the intermediate layer could be formed entirely using tuck interlocking, spacing in knit interlocks better secures the intermediate layer to the front and back side layers of non-fusible fibers. The mixture of interlocks thereby allows for good flow of the fusible material on melting to form a film based on the loose nature of tuck interlocks, as well as good infiltration and bonding to the adjacent layers. In the example shown, the overall construct has 50% of each stitch type.

Looking now at FIG. 8A in more detail, a knit construct is illustrated with a repeating 4×6 pattern of portals in a backside, knit layer of non-fusible fiber, such as polyester, exposing an intermediate layer of a fusible fiber, such as TPU. The construct may be used in the construction of garments and apparel. The backside technical back layer represents the side of the fabric that faces toward and may be placed against the user's body. The selective exposure of the intermediate layer allows for functional and aesthetic options that are not possible with a uniform of material covering the intermediate layer. The layer is defined by a grid of courses and wales of knit fibers. The X's represent a node in the grid where the fusible layer is exposed through an adjacent knit layer. The O's represent nodes in the grid where the non-fusible fiber does not expose the intermediate layer. FIGS. 9A-B show a knitting scheme for a double jersey, spacer knit textile construct of FIG. 8A. The scheme is based on production in a Jacquard knitting machine with a set up for 24 course repeats, each represented in the series of frames or steps 1-24 shown in those figures.

As persons skilled in the art understand, the cambox is a piece of machinery that controls the knit machine needles for the type of stitches required when a yarn is introduced into the overall knit structure. They can be controlled manually or via electronic selection. Depending on the size of the machine diameter and number of feeders, which control exact point where the yarn needs to be place to allow the yarn to be knit into the overall knit structure, will determine how many feeders and corresponding camboxes there are on a knit machine. There are various possible knit machine gauges (needles/inch), with different machine diameters to produce different widths of fabric. A suitable machine for garment and apparel applications where a fine fabric is desired may be a 28-gauge system.

As an example of a performance feature, by using a fusible fiber that has hydrophilic properties, and exposing the fused layer in a pattern, such as shown in FIG. 8A, moisture may move away from a user's body surface. At the same time, the intermediate layer, which can be less durable than an adjacent knit or woven layer, is not fully exposed to damage or wear and is protected by the areas where the adjacent layer is maintained. The enhancement may be achieved via a modified backside of the construct that has a relatively high number of portals, as in FIG. 8A, to allow the moisture to pass through into the membrane lattice quicker via gradient differential pressure. The intermediate layer may then transfer the moisture through to the outer surface layer to allow the moisture to pass completely through the whole fabric for high breathability and comfort of the wearer.

In another application, the intermediate layer may be exposed to create an aesthetic pattern in the inner and/or outer surface of a garment. The pattern may be based on not only the contouring of the front and/or backside of the garment but also on the use of different color yarns in the pattern. In the example shown, only the inner layer has a pattern.

A great range of patterns may be formed using voids or portals in nodes for the courses and wales, as described above. The patterns may be any arrangement of pixilation, using nodes as pixels. The pixelated area may consist of anywhere from at least 1%, 5%, 10%, 15%, 20%, 25%, 30%, 40%, 50%, 55%, 60%, 65%, 70%, 75%, or thereabout, or more of the surface of the front and/or backside of layers adjacent an intermediate layer, as described herein. However, depending on the nature of the intermediate layer, a greater exposed surface area may create instability and durability issues in the overall construct or in the area of the exposed intermediate layer.

One possible modification for improving the waterproofness of an embodiment where the intermediate layer is a barrier film is to plait the back bed (technical face) dial needles with the non-fusible, e.g., Polyester yarn, with a fusible yarn, e.g., TPU yarn, to increase the percentage of the fusible yarn in the structure to create a thicker film, which is more waterproof.

FIGS. 10-16 show an alternative embodiment of a non-plaited, double jersey, spacer knit construct similar in certain general aspects to those in FIGS. 8-9, but which have different patterns of loops and floats and interlocks. FIG. 10A shows a double jersey, spacer knit structure on a set of needles. (Option A.) The technical back layer of fabric is made using a first row of needles (e.g., dial needles) where there are alternating loops and needle floats (Step 1). A second row of needles (e.g., cylinder needles) also has alternating loops and floats. (Step 2.) The second row captures loops in points below each float in needle float and has floats where the first row has loops. The yarns used in each row are non-fusible yarns. The alternating arrangement of loops and floats helps create a better barrier layer and integration with the interlocking fusible fiber. A fusible yarn is used as the interlocking yarn, and it eventually becomes a fused layer that preferably leaves the back and face fabrics in substantially a discrete knit, lattice form formation of the fused layer, as with other embodiments discussed herein. (Steps 3-4.) The technical face is a non-fusible yarn with the same construction (Steps 5-6) as the technical face steps 1-2. The interlocking yarn interlocks the technical back and face, as seen in FIGS. 12A-12B. FIG. 12A shows the loop/floats of non-fusible yarns on first and second rows of needles. FIG. 12B shows the interlocking timber yarns of fusible fibers on first and second rows of needles. FIG. 12C represents the overall integrated structure of non-fusible and fusible yarns.

Figure 11A:
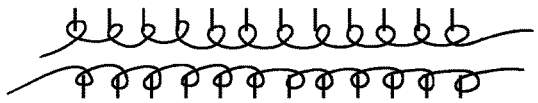
FIGS. 11A-11C show a conventional double jersey knit construction with standard yarns.
Figure 11B:
Figure 11C:
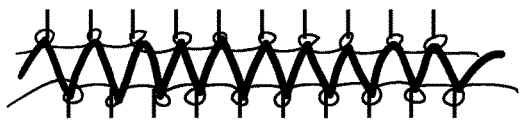
Figure 12A:
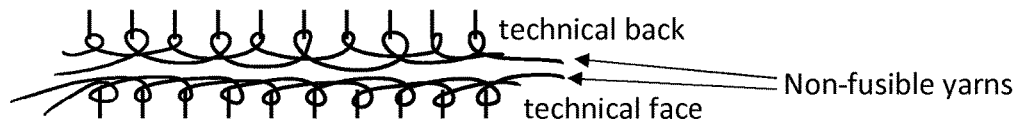
FIGS. 12A-12C illustrate one possible knitting structure and scheme for a textile construct with a fusible layer.
Figure 12B:
Figure 12C:

Although a one-to-one alternating pattern is shown in FIGS. 10A-10B, other patterns are contemplated where floats from a first row of nee are matched with loops from a second row of needles. For example, two, three, four or more loops could be followed by one or more floats with corresponding matching of loops in the second row to the floats in the first row. As a reference point, FIGS. 11A-11C show a conventional double jersey knit construction with standard yarns (i.e., a construction not suitable for creating a fused layer) with no floats in either row of needles.

FIGS. 10A and 10B also show a basic repeat pattern for a knit structure made according to steps 1-6 in Options A and B. Option A is a 3 L construction with predominantly fusible yarn on the technical back and face sides. Option B is has predominantly a fusible fiber on the technical back with some striping of non-fusible fibers. It can be used in a lightweight construct, with the striping serving to provide a buffer against the fused layer abrading or otherwise contacting skin or other adjacent surface. Option B therefore very close to being a 2 L construction, except for the striping.

In FIGS. 10A-B and 11A-C, the fabric construction is a double jersey, weft, spacer knit. A standard spacer knit construction has three components:

1. Technical Back of the Fabric: A single jersey fabric, with Option A being predominately polyester back and Option B being predominantly a fusible yarn.
2. Timber or Separating Yarn. The yarns in a standard construction usually are a monofilament to force the technical face and back fabrics apart. In contrast, according to the inventive subject matter, the timber, spacer yarn is preferably a multifilament—it is easier and quicker to melt many fine filaments instead of one thick filament.
3 Technical Face of the Fabric: A single jersey fabric, which is typically solid to give a flat durable fabric surface.

All 3 components make up a single fabric, with the timber yarn interlocking both the single jersey fabrics together i.e., joining the technical back and face together to form one composite fabric.

Fabric Finishing/Processing

From a high level, according to the inventive subject matter, the fabric that comes off the knit machine is a double jersey (2 sets of needles) spacer knit. When heat is applied, the fusible yarns shrink/melt and pull the technical back and technical face fabrics together. In the process, the fusible yarn creates a barrier film between the outer and inner fabric layers. As a result, the spacer knit undergoing this process (heat being applied) transforms the spacer knit into a single layer of composite materials.

The water resistance/proofness and low and air porosity characteristics of the fabric are gained by the non-fusible yarns contracting, closing the open lattice nature of the technical face and back fabrics, combined with the non-fusible yarns melting and flowing together to form a film or barrier layer.

The knit structure may be subjected to a two-step finishing process:
1. Scour (clean the fabric) and heat set to stabilize the fabric and get to the right dimensional stability
2. Calendaring (heat and pressure) to fuse the fusible yarns and optionally apply a DWR treatment.

As indicated, in certain embodiments, the inventive subject matter contemplates the use of a non-fusible yarn that is shrinkable. The shrinking of the non-fusible yarn helps tighten up the knit structure, pulling the technical back and face together, and allowing the fusible material to flow into gaps and create a low porosity structure. The shrinking of the non-fusible fiber shortens their length and may bulk up the yarn, also contributing to a low-porosity knit structure. Shrinkable yarns are well known to persons skilled in the art. See, for example, U.S. Pat. No. 3,199,281 disclosing a shrinkable polyester and U.S. Pat. No. 7,152,390 disclosing a shrinkable nylon yarn in a multifilament construction around a core of spandex filaments.

One exemplary shrinkable non-fusible yarn is a multifilament yarn having a core with a shrinkable component. In particular, the non-fusible yarn may be a textured multifilament polyester yarn that is wrapped around a core bundle of yarns. Some or all the core yarns may be a bi component yarn wherein one component condenses. While not intending to be bound by any theory of operation, it is believed that in some shrinkable yarns, the condensing or shrinking is based on a filament component becoming helix like under heat or stress and thereby shortening and bulking the surrounding filaments.

As a point of reference, FIG. 13A shows a cross-section of a representative, conventional multi-filament yarn. FIG. 13B shows a side view of a length of such yarn. Also as a point of reference, FIG. 14A shows a cross-section of a representative, conventional multi-filament yarn. FIG. 14B shows a side view of a length of such yarn.

In contrast, FIGS. 15-16 show details of a textured multifilament polyester yarn that is wrapped around a core bundle of yarns, which may be used as a shrinkable, non-fusible yarn in connection with certain embodiments, disclosed herein, particularly those of FIGS. 10A-B and 11A-C. It is expected that such embodiments can achieve CFM ratings of around 2-3, for example. Looking more particularly at exemplary yarns suitable for use in the foregoing and other embodiments. FIG. 15 shows a multicomponent yarn having at least one component that is shrinkable under a condition such as heat or other stress. A second component is non-shrinkable relative to the shrinkable component under set processing conditions. The two components runs generally parallel each other and are integrated into unitary or monolithic structure. The different components can be made of the same class of materials or of different classes materials. FIG. 16A shows a cross-section of a multifilament yarn formed of a core of bi-component yarns and surrounding textured yarns. FIG. 16B shows a side view of a length of the yarn of FIG. 16A. Yarns that shrink at least 5% to 40%, or thereabout, are suitable for use as a shrinkable, non-fusible yarn. Other ranges are possible. For example, yarns that shrink at least 10%, 15%, 20%, 25%, 30%, and 35% may also be suitable, depending on the degree of porosity or other parameters desired. Suitable temperatures for shrinking the fiber are from 110 degrees C. to 160 degrees C. or thereabout.

The following are more particulars of suitable yarns that may be used in the foregoing embodiments.
Yarns
Shrinkable, Non-Fusible Yarn
Non-fusible yarn: Polyester 50D/48F, this yarn is made up in 2 different yarns. For example, 30D/40F textured Polyester and core of 20D/8F bi-component polyesters, The textured, multifilament polyester yarn is wrapped around a core bundle of yarns. (FIGS. 16A-16B.) The core bundle of yarns are made up of multifilament bi-component filaments, that once heat is applied one side of the bi-component polymer will shrink and presumably create a helix formation reducing the length of yarn by 10-30%. Another possibility is a 30D/24F polyester yarn, which may be used to reduce the weight of a fabric.
Fusible Yarn
In the foregoing embodiments connected with FIGS. 10A-B and 11A-C, a suitable fusible fiber is a 80D/34F multi-filament, hydrophilic, TPU. This yarn shrinks and melts to form a barrier.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

All patent and non-patent literature cited herein is hereby incorporated by references in its entirety for all purposes.

As used herein, "and/or" means "and" or "or", as well as "and" and "or." Moreover, any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of lending systems and other systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

The invention claimed is:

1. A textile construct, comprising:
a first side or layer of the textile construct comprising a porous membrane of fused material having a substantially solid surface area of at least 90%;
a second side or layer of the textile construct comprising a discrete lattice structure of filaments, the second side or layer being adjacent to and coextensive with the first side or layer; and
the porous membrane of fused material and discrete lattice structure being formed of a unitary plaited knit structure of a plurality of two or more paired fusible and non-fusible filaments in a plurality of courses and wales, wherein the fusible filaments in the two or more paired fusible and non-fusible filaments are selectively disposed primarily on the first side or layer of the textile construct and the non-fusible filaments in the two or more paired fusible and non-fusible filaments are selectively disposed primarily on the second side or layer of the textile construct, the porous membrane of fused material being formed of the fusible filaments.

2. The textile construct of claim 1 wherein the plaited knit structure comprises a single jersey plaited knit structure and the first side or layer of the textile construct comprises the porous membrane, the porous membrane being formed of filaments in the same single jersey plaited knit structure of which the discrete lattice is formed.

3. The textile construct of claim 1 wherein the porous membrane of fused material is an intermediate layer between the second side or layer and a third side or layer comprising a second discrete lattice structure, the second side comprising the discrete lattice structure in a unitary structure with a first side of the porous membrane and the third sides comprising the second discrete lattice structure of filaments in a unitary structure with a second side of the porous membrane.

4. The textile construct of claim 3 wherein the construct comprises a double jersey spacer knit structure having technical back and technical face fabrics corresponding to the second and third sides or layers, the porous membrane of fused material being formed at least in part by fusible filaments used as spacer yarns to interlock the technical back and face in the unitary structure.

5. The textile construct of claim 4 wherein at least one of a technical back or face in the double jersey structure has a pattern of alternating loops and floats on one side and an opposing side has loops that match to the floats.

6. A textile construct of claim 3 the second layer and/or third layer comprising a grid of nodes defined by intersecting courses and wales, a pixelated pattern of portals or voids being defined in the second layer and/or third layer, exposing the intermediate layer.

7. The textile construct of claim 6 wherein one of the second and third sides or layers comprises a back layer, wherein the pixelated pattern is formed in the technical back of the back layer.

8. The textile construct of claim 6 wherein the pixelated pattern comprises at least 5% of the surface of the front and/or backside of layers adjacent the intermediate layer.

9. The textile construct of claim 1 wherein the porous membrane of fused material has a porosity or diffusibility sufficient to allow for selective blocking of liquid phase water on one surface and passage of vapor phase water through an opposite surface during conditions intended for an outdoor apparel usage.

10. The textile construct of claim 1 wherein the porous membrane of fused material has porosity sufficient for air permeability of 1.0 to 80 CFM or thereabout.

11. The textile construct of claim 9 wherein the fusible filaments comprise filaments having a glass transition temperature in the range of 110 degrees C. to 160 degrees C. or thereabout.

12. The textile construct of claim 11 wherein the non-fusible filaments comprise a shrinkable yarn capable of shrinking in length 5%-40% or thereabout when subjected to a temperature of from 110 degrees C. to 160 degrees C. or thereabout.

13. The textile construct of claim 12 wherein the porous membrane of fused material has a pore density of at least 9 billion pores per square inch and/or average pore size of 0.2 microns or less.

14. The textile construct of claim 13 wherein the construct has an elasticity of 1% to about 30%, and wherein the fusible and non-fusible fibers have stretchability values within 40% of each other.

15. The textile construct of claim 1 wherein the shrink or stretch ratio of the non-fusible filaments and fusible filaments is matched so that in the textile construct the shrinking or stretching of the material for one of the porous membrane of fused material or discrete lattice structure will not cause delamination, separation, tearing or other significant damage to the other of the porous membrane or lattice structure during shrinking or stretching of the textile construct.

16. The textile construct of claim 9 wherein the membrane provides waterproofness or water resistance and/or breathability to the construct according to one or more of the following standards:
Low range hydrostatic—AATCC127 (Option 2) or JIS L1092;
High range hydrostatic—ASTM D751 (Fed Std 191-A55);
MVTR (upright)—ASTM E96B;
MVTR (inverted)—JIS L 1099 (Method B); and
Air Permeability—ASTM D737.

17. A textile construct of the claim 13 wherein the fusible filaments comprise a thermoplastic PTFE.

18. The textile construct of claim 1 wherein a combination of tuck and knit stitches are used in the construct, the tuck stitches being made with fusible filaments and the knit stitches being made with non-fusible filaments comprising shrinkable yarn arranged and adapted to pull the second side or layer towards the first side or layer when shrunk.

19. A method of forming a textile construct, comprising:
providing a composite lattice structure comprising a unitary plaited knit structure of a plurality of two or more paired fusible and non-fusible filaments in a plurality of courses and wales, with the fusible filaments in the two or more paired fusible and non-fusible filaments being selectively disposed primarily on a first side or layer of the composite lattice structure and the non-fusible filaments in the two or more paired fusible and non-fusible filaments being selectively disposed primarily on a second side or layer of the lattice structure adjacent to and coextensive with the first side or layer; and
subjecting the composite lattice structure to a fusing agent, sufficient to selectively cause the fusible filaments in the first side or layer to fuse into a porous membrane of fused material having a substantially solid surface area of at least 90% and disposed substantially on the first side or layer of the construct while maintaining the side or layer substantially in a discrete lattice structure.

20. The method of claim 19 wherein the composite lattice structure further comprises a third group of non-fusible filaments in a third side or layer on an opposite side of the porous membrane of fused material as the second side or layer.

21. A textile construct, comprising:
a first side or layer of the textile construct comprising a porous membrane of fused material having a substantially solid surface area of at least 90%;
a second side or layer comprising a discrete lattice structure of filaments, the second side being adjacent to and coextensive with the first side or layer of the porous membrane of fused material; and
the porous membrane and discrete lattice structure being formed of a unitary plaited knit structure of a plurality of two or more paired fusible and non-fusible filaments, wherein the fusible filaments in the two or more paired fusible and non-fusible filaments are preferentially disposed on the first side or layer of the textile construct and the non-fusible filaments in the two or more paired fusible and non-fusible filaments are preferentially disposed on the second side or layer of the textile construct, the porous membrane being formed of the fusible filaments; and
wherein a combination of tuck and knit stitches are used to form the construct, the tuck stitches being made with unpaired fusible filaments and knit stitches being made with the paired filaments.

22. The textile construct of claim 21 wherein the non-fusible filaments comprise shrinkable yarns filaments arranged and adapted to pull the second side or layer towards the first side or layer when shrunk.

23. The textile construct of claim 22 wherein the shrinkable yarns comprise multifilament yarns having (1) a core comprising one or more bicomponent filaments and (2) one or more textured yarns surrounding the core, the bi-component filaments comprising first and second parallel components having differing shrinkability.

24. The textile construct of claim 21 wherein the porous membrane is an intermediate layer between the second side or layer and a third side or layer comprising a second discrete lattice structure, the second side comprising the discrete lattice structure in a unitary structure with a first side of the porous membrane and the third side comprising the second discrete lattice structure of filaments in a unitary structure with a second side of the porous membrane.

25. The textile construct of claim 24 wherein the porous membrane has a porosity or diffusibility sufficient to allow for selective blocking of liquid phase water on one surface and passage of vapor phase water through an opposite surface during conditions intended for an outdoor apparel usage.

26. The textile construct of claim 21 wherein the porous membrane has porosity sufficient for air permeability of 1.0 to 80 CFM or thereabout.

27. The construct of claim 21 wherein the construct comprises a double jersey spacer knit structure having technical back and technical face fabrics corresponding to the second and third sides or layers, wherein at least one of a technical back or face in the double jersey structure has a pattern of alternating loops and floats on one side and an opposing side has loops that match to the floats.

28. A textile construct, comprising:
a first side or layer of the textile construct comprising a porous membrane of fused material having a substantially solid surface area of at least 90%;
a second side or layer comprising a discrete lattice structure of filaments, the second side being adjacent to and coextensive with the first side or layer of the porous membrane; and
the porous membrane and discrete lattice structure forming a unitary knit structure of fusible and non-fusible filaments, wherein the discrete lattice structure comprises non-fusible filaments comprising shrinkable yarns, the fusible filaments being primarily disposed on the first side or layer of the textile construct and the non-fusible filaments being primarily disposed on the second side or layer of the textile construct, the porous membrane being formed of fused fusible filaments;
wherein a combination of tuck and knit stitches are used to form the unitary knit structure, the tuck stitches being made with the fusible filaments and knit stitches being made with the non-fusible filaments; and
wherein the shrinkable yarns in a shrunken configuration pull the second side or layer towards the first side or layer and to form a low-porosity knit structure with the porous membrane of fused material.

29. The textile construct of claim 28, wherein the shrinkable yarns comprise multifilament yarns having (1) a core comprising one or more bicomponent filaments and (2) one or more textured yarns surrounding the core, the bi-component filaments comprising first and second parallel components having differing shrinkability.

30. The textile construct of claim 28, wherein the porous membrane has a porosity or diffusibility sufficient to allow for selective blocking of liquid phase water on one surface and passage of vapor phase water through an opposite surface during conditions intended for an outdoor apparel usage.

* * * * *